(12) United States Patent
Lu et al.

(10) Patent No.: US 12,008,731 B2
(45) Date of Patent: Jun. 11, 2024

(54) PROGRESSIVE DATA COMPRESSION USING ARTIFICIAL NEURAL NETWORKS

(71) Applicant: QUALCOMM Incorporated, San Diego, CA (US)

(72) Inventors: Yadong Lu, Irvine, CA (US); Yang Yang, San Diego, CA (US); Yinhao Zhu, La Jolla, CA (US); Amir Said, San Diego, CA (US); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 17/648,808

(22) Filed: Jan. 24, 2022

(65) Prior Publication Data

US 2022/0237740 A1 Jul. 28, 2022

Related U.S. Application Data

(60) Provisional application No. 63/141,322, filed on Jan. 25, 2021.

(51) Int. Cl.
 *G06T 3/4046* (2024.01)
 *G06T 9/00* (2006.01)

(52) U.S. Cl.
 CPC ............ *G06T 3/4046* (2013.01); *G06T 9/002* (2013.01)

(58) Field of Classification Search
 CPC ...... G06T 3/4046; G06T 9/002; H04N 19/126
 See application file for complete search history.

(56) References Cited

U.S. PATENT DOCUMENTS

2020/0304147 A1 9/2020 Choi et al.

OTHER PUBLICATIONS

Akbari M., et al., "Learned Variable-Rate Image Compression with Residual Divisive Normalization", arxiv.org, Cornell University Library, 201 Olin Library Cornell University Ithaca, NY14853, Dec. 12, 2019 (Dec. 12, 2019), XP081550294, 6 Pages, paragraph [001.] -paragraph [002.].
Anonymous: "Quantization (Signal Processing)", Wikipedia, Dec. 14, 2020 (Dec. 14, 2020), 14 Pages, XP055914124, Retrieved from the Internet: URL:https://en.wikipedia.org/w/index.php?title=Quantization_(signal_processing)&oldid=994267421 [retrieved on Apr. 20, 2022].
International Search Report and Written Opinion—PCT/US2022/013723—ISA/EPO—May 3, 2022.

(Continued)

*Primary Examiner* — Charles T Shedrick
(74) *Attorney, Agent, or Firm* — Patterson & Sheridan LLP

(57) ABSTRACT

Certain aspects of the present disclosure provide techniques for compressing content using a neural network. An example method generally includes receiving content for compression. The content is encoded into a first latent code space through an encoder implemented by an artificial neural network trained to generate a latent space representation of the content. A first compressed version of the encoded content is generated using a first quantization bin size of a series of quantization bin sizes. A refined compressed version of the encoded content is generated by scaling the first compressed version of the encoded content into one or more second quantization bin sizes smaller than the first quantization bin size, conditioned at least on a value of the first compressed version of the encoded content. The refined compressed version of the encoded content is output for transmission.

28 Claims, 15 Drawing Sheets

(56) References Cited

OTHER PUBLICATIONS

Theis L., et al., "Lossy Image Compression with Compressive Autoencoders", arxiv.org, Cornell University Library, 201 Olin Library Cornell University Ithaca, NY14853, Mar. 1, 2017 (Mar. 1, 2017), XP080753545, pp. 1-19, Sections II, III, Annex A.3.

PROGRESSIVE DATA COMPRESSION USING ARTIFICIAL NEURAL NETWORKS

CROSS-REFERENCE TO RELATED APPLICATIONS

This application claims the benefit of and priority to U.S. Provisional Patent Application No. 63/141,322, entitled "Progressive Data Compression Using Artificial Neural Networks", filed on Jan. 25, 2021, and assigned to the assignee hereof, the contents of which are incorporated herein by reference in their entirety.

INTRODUCTION

Aspects of the present disclosure relate to machine learning and, more particularly, to using artificial neural networks to compress data, such as video content.

Data compression techniques may be used to reduce the size of content for various reasons, including to improve the efficiency of storage and transmission, and to match the intended use (e.g., an appropriate resolution of data for the size of a device's display). Data compression may be performed using lossy techniques such that the decompressed version of the data is an approximation of the original data that was compressed or by using lossless techniques that result in the decompressed version of the data being equivalent to the original data.

Generally, lossless compression may be used where data should not be lost in compression, such as in compressing archives of files. In contrast, lossy compression may be used where an exact reproduction of the original data is not needed (e.g., in compressing still images, video, or audio, where some data loss, such as losses in the fineness of color data or in audio frequencies at extremes of the audible spectrum, can be tolerated).

Data compression schemes may often be defined or based on a fixed rate of compression (e.g., a single bit rate), which makes these compression schemes inflexible to varying data types and compression needs. That is, for any given compression scheme, data is generally compressed at a particular bitrate regardless of whether the data is amenable to a higher or lower compression bitrate. For example, in images that do not include fine detail, a fixed bitrate compression scheme may compress these images using more bits than necessary in order to represent the information in the images, even though the images may be amenable to compression using lossier compression schemes (and correspondingly lower bitrates). Similarly, a more detailed image may be compressed with too low a bitrate to be satisfactorily reproduced. Thus, traditional schemes often involve a tradeoff in the design of the fixed compression scheme, which is not dynamic and adaptable.

Accordingly, what is needed are improved techniques for adaptively compressing content.

BRIEF SUMMARY

Certain aspects provide a method for compressing content using a neural network. An example method generally includes receiving content for compression. The content is encoded into a first latent code space through an encoder implemented by an artificial neural network. A first compressed version of the encoded content is generated using a first quantization bin size of a series of quantization bin sizes. A refined compressed version of the encoded content is generated by scaling the first compressed version of the encoded content into one or more second quantization bin sizes smaller than the first quantization bin size, conditioned at least on a value of the first compressed version of the encoded content. The refined compressed version of the encoded content is output.

Certain aspects provide a method for decompressing compressed content using a neural network. An example method generally includes receiving encoded content for decompression. An approximation of a value in a latent code space is recovered from the received encoded content by recovering codes from a series of quantization bin sizes, wherein the series of quantization bin sizes comprises a first quantization bin size and one or more second quantization bin sizes smaller than the first quantization bin size. A decompressed version of the encoded content is generated by decoding the approximation of the value in the latent code space through a decoder implemented by an artificial neural network. The decompressed version of the encoded content is output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
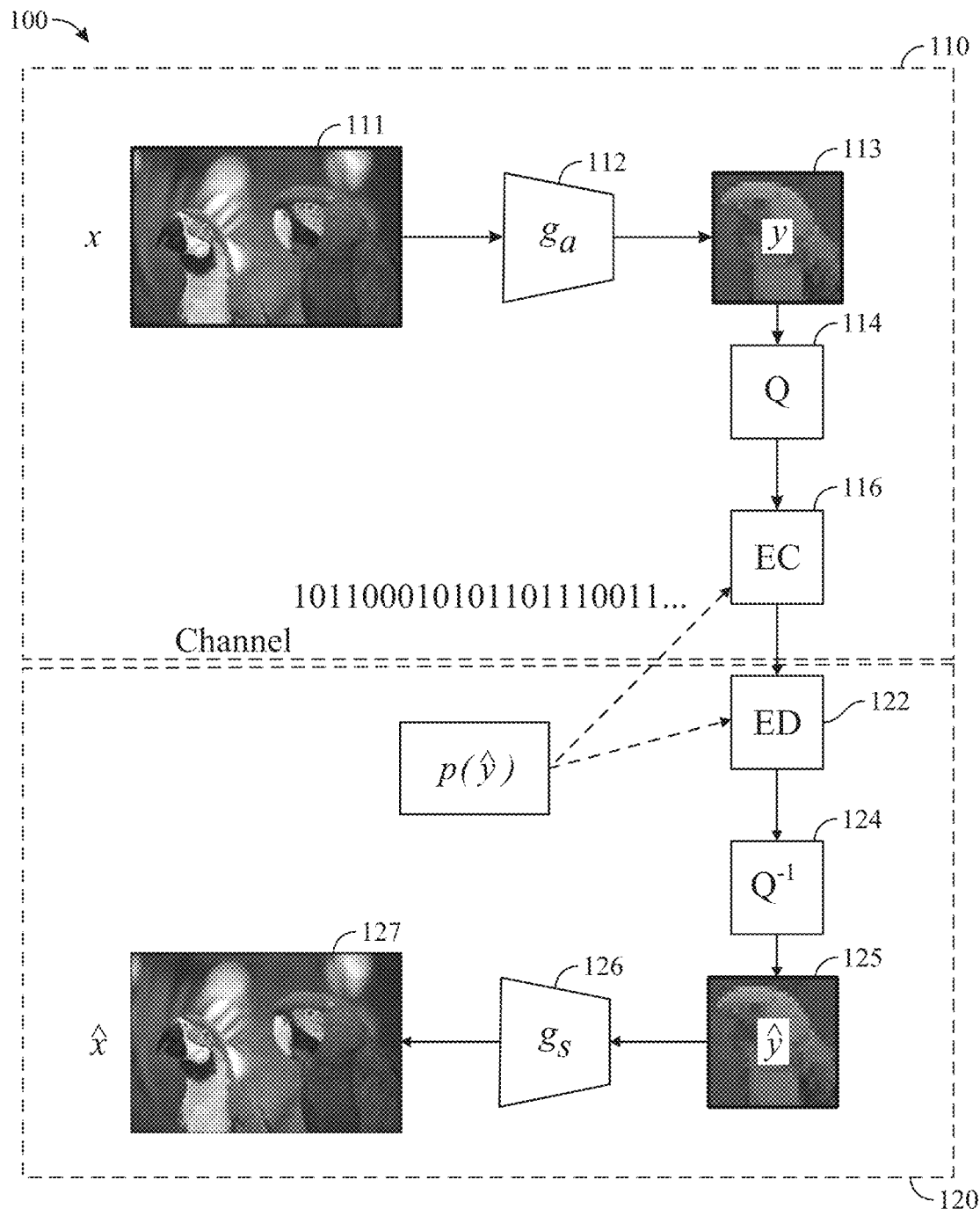
FIG. 1 depicts an example neural network-based data compression pipeline.

Aspects of the present disclosure provide techniques for progressively compressing content using artificial neural networks such that a single model can be used to encode content at varying bitrates or levels of quality.

Neural network-based data compression systems can be used for compression various types of data. For example, neural network-based data compression can be used to compress various type of content that is amenable to compression. This content may include, for example, video content, image content, audio content, sensor content, and other types of data that are amenable to compression. Generally, neural network-based data compression may compress content using a bitrate that is determined a priori based on a tradeoff between the size of the encoded content and distortion (a difference between the original content and the decompressed content). In many data compression systems, higher bitrates (e.g., larger numbers of bits used to represent the content to be compressed) may be associated with lower distortion, while smaller bitrates may be associated with higher distortion. The tradeoff between distortion D and bitrate R may be represented by the equation $$\min_{\theta} \mathbb{E}_x[D_\theta(x) + \beta R_\theta(x)],$$

where θ represents parameters in an auto-encoder which are optimized from end-to-end (e.g., using stochastic gradient descent methods), and β represents a weight applied to a bitrate R.

Typical neural network-based data compression, however, may not be suited for large scale deployments for various reasons. For example, in many machine-learning-based compression schemes, models may need to be trained in order to support different bitrates. That is, a first model may be trained for a low (baseline) bitrate, a second model may be trained for a second bitrate higher than the baseline bitrate, a third model may be trained for a third bitrate higher than that of the second model, and so on. In other machine-learning-based compression schemes, an encoder and a decoder network may be dependent on the β parameter so that a single model can adapt to different rate-distortion tradeoffs. Other machine-learning-based compression schemes may learn to adjust quantization step sizes of generated latents. However, these models may not be able to effectively learn a compression scheme that allows for variable coding of content. This variable coding may be achieved through a progressive coding scheme, or an encoding scheme that allows for data to be compressed using multiple bitrates so that certain data can be encoded and decoded using lower bitrates and other data (e.g., portions of an image with more detail that should be encoded in such a manner that, when decoded, results in a more faithful reconstruction of such detail) can be encoded and decoded using higher bitrates dynamically to account for differences in data being compressed.

Aspects of the present disclosure provide techniques that allow for progressive coding (and compression) of content using a single model. In progressive coding of content, higher bitrate codes may be generated based on lower bitrate codes such that an encoded, compressed version of input data is compressed progressively using a plurality of bitrates without needing to compress the input data using multiple models. The compressed data can then be recovered using any of the plurality of bitrates according to various considerations, such as processing capabilities of the device decompressing the data, the amount of detail needed in the decompressed data, and the like. Further, progressively compressed data may be stored in a single file versus multiple versions, each compressed at a different bitrate, which may improve the storage and transmission efficiency for the compressed data.

Example Neural Network-Based Data Compression Pipeline

FIG. 1 depicts an example neural network-based data compression pipeline 100, according to aspects of the present disclosure. As illustrated, pipeline 100 is configured to receive content x 111 for compression and generate a compressed bitstream from which an approximation x̂ 127 of content x 111 can be recovered. Generally, an encoding side 110 of pipeline 100 includes a convolutional neural network-based nonlinear transformation layer ($g_a$) 112 that maps content x 111 to a code y 113 in a latent code space, a learned quantization scheme (Q) 114 that compresses the code y 113 in the latent code space, and an entity coder 116 that generates a bitstream representing a compressed (quantized) version of the content. The latent code space may be a compressed space in a hidden layer of a neural network into which content can be mapped. Codes in the latent code space generally represent losslessly compressed versions of the input data to which these codes are mapped so that the features of the input data, which may exist in multiple dimensions, are reduced to a more compact representation.

On the decoding side 120 of pipeline 100, an entity decoder 122 recovers a quantized version of the content, and an inverse quantization scheme ($Q^{-1}$) 124 recovers an approximated code ŷ. A convolutional neural network-based nonlinear transformation layer ($g_s$) 126 may then generate the approximation $\hat{x}$ of content x from the approximated code $\hat{y}$ and output the approximation $\hat{x}$ of content x (e.g., for display on a user device or for storage in a persistent data store from which compressed content may be retrieved for transmission to a user device).

Training losses entailed in neural network-based data compression may be represented as a sum of an amount of distortion (e.g., calculated between the content x 111 and the approximation $\hat{x}$ 127 of content x 111) and a rate parameter β, which generally represents a compression bitrate. As discussed above, increasing β generally results in increased quality and decreased amounts of compression. If the compression bitrate is increased, the resulting compressed version of input data may have a larger size than if compression bitrate is smaller. Thus, there will be more data to transmit, which may increase the amount of power needed to receive and decompress the data, more network capacity used to transmit the compressed version of the input data, more storage needed to store the compressed version of the input data, more processing power needed to decompress the compressed version of the input data, and so on.

Generally, independent models may be trained to obtain different bitrate options for compressing content. However, such independent models are not capable of progressive encoding of content because the models are trained separately and have no relationships. Thus, these independent models are non-progressive models in which a single encoder-decoder is used and various parameters can be used to steer the rate-distortion tradeoff of the independent models. Further, variable bit rate solutions may involve the creation, transmission, and/or storage of multiple copies of encoded versions of an input at different quality levels, which may increase the amount of data generated, transmitted, and stored in data compression operations.

Aspects of the present disclosure provide for progressive compression of data using a single encoder-decoder model. Generally, compression of data may be achieved using coding techniques that encode data into more compact representations. These coding techniques, referred to herein as progressive coding, but also known as embedded coding or scalable coding, allow for content to be encoded once, with each of a plurality of bitrates being embedded. By encoding content once with a plurality of bitrates embedded, dynamic control of compression bitrate may be simplified such that multiple encoded versions of data need not be generated to support different compression bitrates (and thus, different levels of compression quality preservation).

For example, bitrates of broadcast content may be adapted dynamically (e.g., in response to available throughput, latency, complexity of content and an amount of detail to be preserved in compressing this content, and the like). Further, progressive coding of content may allow for reduced transmission and storage costs by providing a single version of the compressed content that can be decoded using various bitrates instead of multiple versions of the compressed content generated for each of a plurality of supported bitrates.

To allow for progressive coding of content so that content is encoded once with each of a plurality of bitrates being embedded, a latent space code y representing content x may be encoded using nested quantization model in which codes associated with finer quantization levels (and correspondingly, higher bitrate compression) are embedded in codes associated with coarser quantization levels (and correspondingly, lower bitrate compression), As discussed in further detail herein, nested quantization may allow for codes associated with finer quantization levels to be conditioned on the codes associated with coarser quantization levels so that data can be progressively encoded into finer quantization levels, with correspondingly progressive increases in bitrate and quality of the decompressed data.

In a nested quantization model, starting with a high bitrate model, a series of quantization bin sizes may be learned. Each quantization bin size of the series may be associated with a particular parameter (e.g., value of β). Starting from a coarsest quantization bin (i.e., a quantization bin associated with a lowest bitrate), the latent space code y representing content x may be progressively coded into finer quantization bins. As discussed in further detail herein, the bits for a specific quantization bin may be represented as a sum of the bits for the coarsest quantization bin and each progressively finer quantization bin up to the specific quantization bin according to the chain rule of quantized probabilities. Generally, at each quantization level in the nested quantization model, a probability may be associated with each code of a possible universe of codes, and the code with the highest probability may be selected as the code into which data is compressed at that quantization level. Based on the chain rule, it may be seen that the code into which data is compressed at any given quantization level N may be represented as a function of the codes into which data is compressed in the quantization levels lower than N (i.e., in the quantization levels associated with coarser quantization bins). For example, the bits for the finest quantization bin (i.e., the $N^{th}$ of N quantization bins) may be represented by the equation:

$$\log\frac{1}{P(y_N)} = \log\frac{1}{P(y_1)} + \log\frac{1}{P(y_2 \mid y_1)} + \ldots + \log\frac{1}{P(y_N \mid y_1, y_2, \ldots, y_{N-1})}$$

where $P(y_N)$ is the probability mass under a distribution curve in which the code associated with the compressed input data is located in the $N^{th}$ quantization bin and $P(y_N|y_{N-1})$ is the probability mass under a distribution curve in which the code associated with the input data is located in the $N^{th}$ quantization bin, conditioned on the code associated with the input data in the $N-1^{th}$ quantization bin. In other words, the bits for the finest quantization bin $$\left(\text{i.e., } \log\frac{1}{P(y_N)}\right)$$

may be represented as the sum of the bits for the coarsest quantization bin $$\left(\text{i.e., } \log\frac{1}{P(y_1)}\right),$$

the bits for a second quantization bin conditioned on the coarsest quantization bin $$\left(\text{i.e., } \log\frac{1}{P(y_2 \mid y_1)}\right),$$

the bits for the third quantization bin conditioned on the coarsest quantization bin and the second quantization bin $$\left(\text{i.e., } \log \frac{1}{P(y_3 \mid y_1, y_2)}\right)$$

and so on.

Further, as will be discussed in further detail below, progressive coding may be used in channel-based latent ordering. In channel-based latent ordering, quantization bin sizes may be progressively refined across different channels in the data to be compressed.

For example, in video content represented by the luminance (Y), blue difference (Pb), and red difference (Pr) channels, different bin sizes may be used for the Y, Pb, and Pr channels. In another example, for visual content represented by chrominance channels (e.g., red (R), green (G), and blue (B) color channels), different bin sizes may be used for the R, G, and B color channels. The ordering of these channels may be defined by sorting channels based on a ratio of a distortion difference and rate difference calculated for each channel so that coarser quantization bins are used for channels for which higher compression does not result in significantly more distortion and finer quantization bins are used for channels for which higher compression results in significantly more distortion. Thus, by ordering channels and encoding the channels using different quantization bins according to the order in which the channels are ordered, multi-channel content may be encoded so that channels having the largest impact on the quality of the resulting decompressed data may be compressed using the highest quality compression and channels with lesser impact on the quality of the resulting decompressed data may be compressed using lower quality compression. This may reduce the size of the resulting compressed representation of the input data, which in turn may reduce storage and transmission costs for the compressed data.

Figure 2:
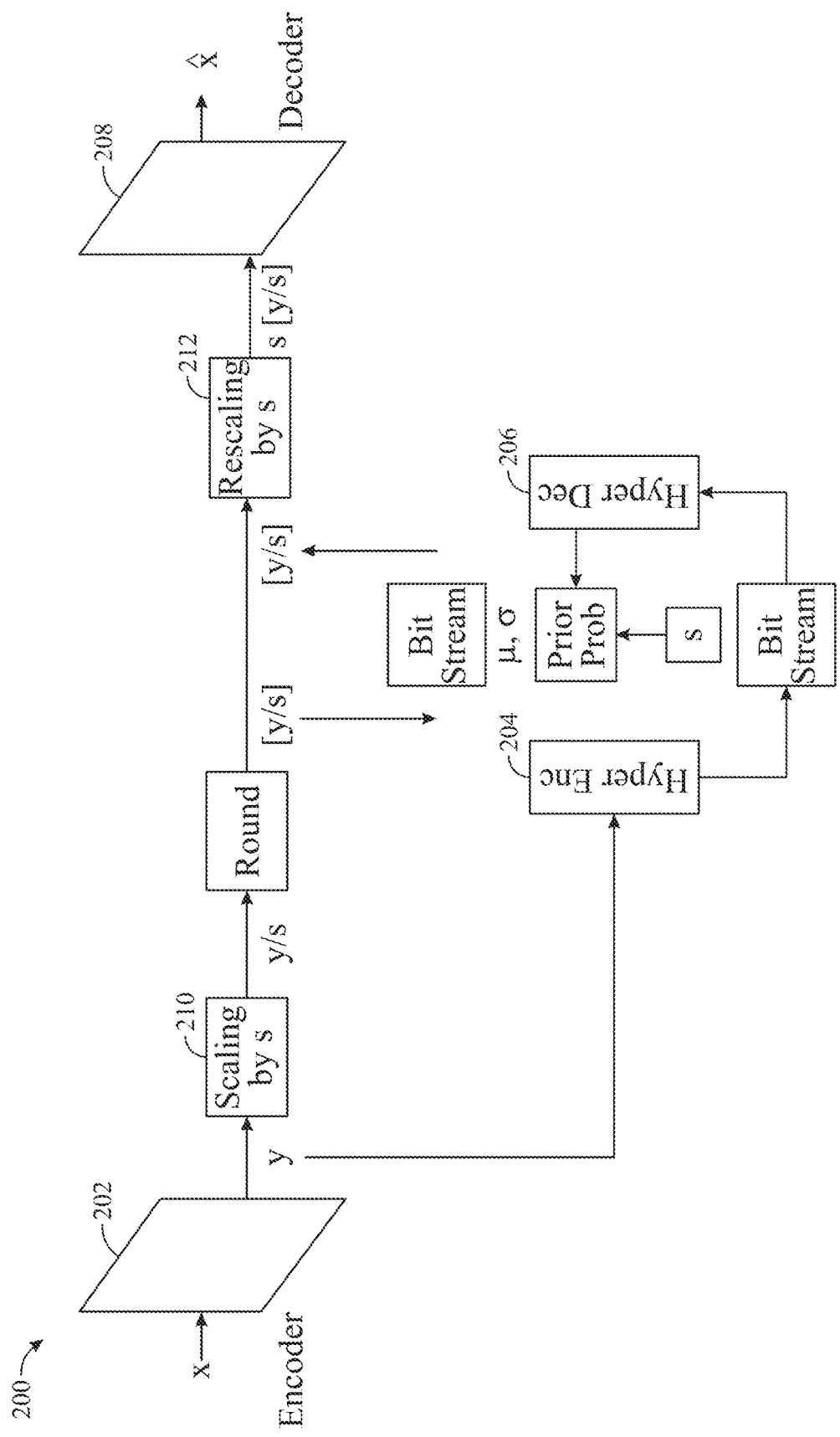
FIG. 2 illustrates an example pipeline for compressing and decompressing content using encoders and decoders implemented as artificial neural networks and continuous scaling of compression bitrate.

FIG. 2 illustrates further details of a pipeline for compressing and decompressing content (e.g., as illustrated in FIG. 1) using encoders and decoders implemented as artificial neural networks and continuous scaling of compression bitrate.

In pipeline 200, an encoder 202 encodes an input x into a latent space code y. To continuously control the latent bitrate, latent space code y is processed through a hyperencoder 204, which may be another network used to generate weights for the encoder neural network, to generate a hyper latent representing inputs used to control the weights in the encoder neural network. The hyper latent may be used as information that captures spatial dependencies in data and may be used to round (or quantize) y into a rounded (quantized) representation of y, designated as [y] (a simplified version of the quantization, when no scaling factor is applied such that s=1; in such a case, $$\left[\frac{y}{s}\right] = \left[\frac{y}{1}\right] = [y]$$

A prior model may characterize the probability distribution (not shown) used to quantize y into [y], where [y] corresponds to the quantized value at a given quantization level associated with a highest probability in the probability distribution.

On the decoder side, a hyperdecoder 206, which may be a network used to generate weights for the decoder neural network, decodes the hyper latent to determine an entropy model used to code the rounded (quantized) latent space code [y]. The entropy model may be, for example, the probability model used to generate the probability distribution used on the encoder side of pipeline 200 to encode y into code [y] Based on the entropy model, a decoder 208 recovers $\hat{x}$ from [y], and $\hat{x}$ may be output (e.g., for display, transmission to a display device, etc.).

In some cases, a scaling factor can be applied in pipeline 200 to impact the bitrate and amount of compression applied when generating a compressed version of content x. In this case, a scaling parameter s may be applied at scaler 210 prior to quantization (rounding y to a quantized value) and a rescaler 212 prior to decompression; thus, the quantized and scaled version of the latent space code y representing content x may be represented as y/s. By scaling y by the scaling factor s, the quantization bin size used to round (quantize) y may be changed from a base value (e.g., 1) to a different value corresponding to a finer or coarser degree of quantization and thus a finer or coarser degree of compression. This allows a model to be trained with respect to a quantization bin size and allows for usage of different distortion-rate tradeoffs.

Example Scaling of Quantization Width in Progressive Coding of Data

Figure 3:
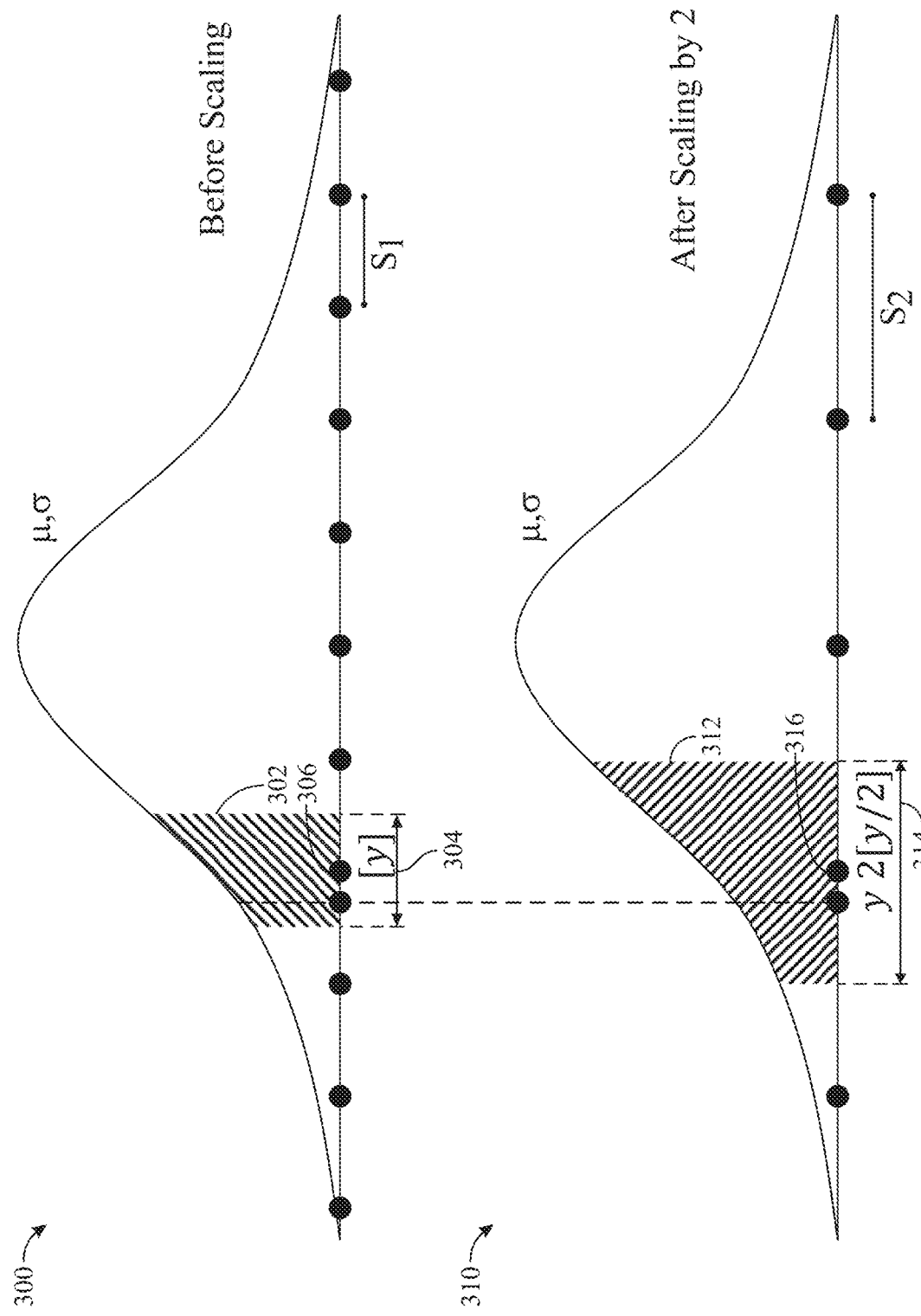
FIG. 3 illustrates an example of latent scaling of quantization width in continuous control of compression bitrate, according to aspects of the present disclosure.

FIG. 3 illustrates an example of latent scaling of a quantization width in continuous control of compression bitrate. As illustrated, prior to scaling by s, for a given value y, the quantization of y results in a rounding to a nearest discrete point [y] 306. To quantize y into [y] 306 and send through entropy coding, a system can calculate a probability mass 302 within the probability distribution 300 between an upper bound and a lower bound of a quantization bin 304 in which y lies. The probability mass may be represented by the equation:

$$\int_{[y]-\frac{1}{2}}^{[y]+\frac{1}{2}} pdf(a) da = CDF\left([y] + \frac{1}{2}\right) - CDF\left([y] - \frac{1}{2}\right)$$

where pdf(a)da is the value of a probability distribution function between the upper bound and lower bound of quantization bin 304 and CDF is the value of a cumulative distribution function at a given value along the probability distribution 300. The probability mass may thus be represented as a difference between the cumulative distribution function of the upper bound of the quantization bin and the cumulative distribution function of lower bound of the quantization bin. The probability mass may represent the number of bits needed to quantize y into [y], which may be one of the plurality of dots illustrated below the probability distribution 300.

When scaling is applied, the quantization bin size may be changed to a different value. For example, a scaling factor s of 2, as illustrated in scaled probability distribution 310, may double the width of the quantization bin size and halve the number of possible values to which y can be coded (i.e., as illustrated by the plurality of dots below probability distribution 310). After scaling by s, for a given value of y, the quantization of y results in a rounding to a nearest discrete point 2[y/2] 316. To quantize and scale y into 2 [y/2] and send through entropy coding, a system can calculate a probability mass 312 within the scaled probability distribution 310 between an upper bound and a lower bound of the scaled quantization bin 314 in which y lies. The probability mass may be represented by the equation:

$$\int_{\lceil \frac{y}{s}\rceil-\frac{1}{2}}^{\lceil \frac{y}{s}\rceil+\frac{1}{2}} s \times pdf(sa)da =$$

$$\int_{s\lceil \frac{y}{s}\rceil-\frac{s}{2}}^{s\lceil \frac{y}{s}\rceil+\frac{s}{2}} pdf(a)da = CDF\left(s\left\lceil\frac{y}{s}\right\rceil+\frac{s}{2}\right) - CDF\left(s\left\lceil\frac{y}{s}\right\rceil-\frac{s}{2}\right).$$

This corresponds to a larger quantization interval and a smaller number of bits than that illustrated in probability distribution 300.

Figures 4A, 4B:
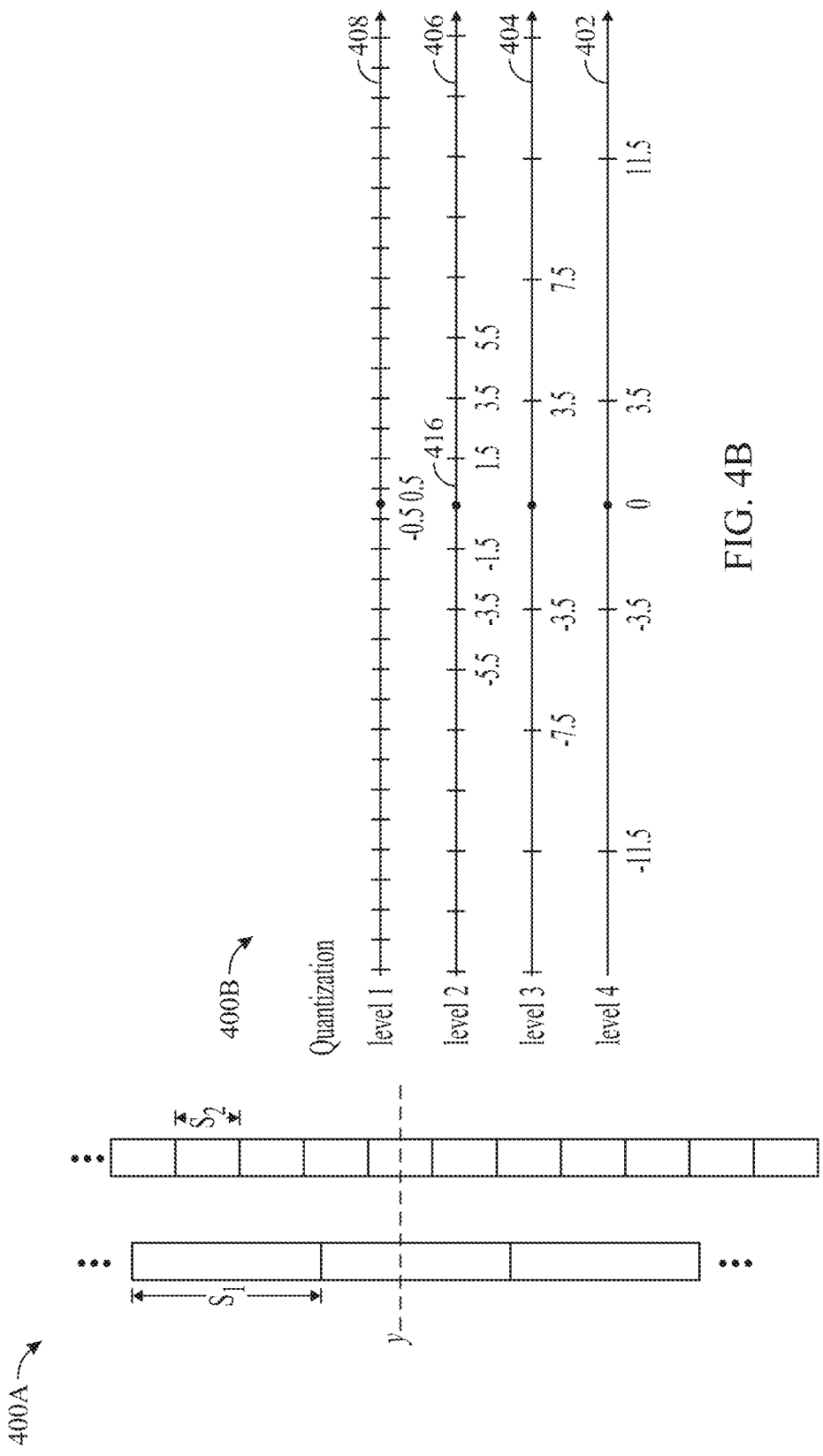
FIG. 4A illustrates an example of quantization bin sizes used to achieve different compression bitrates, according to aspects of the present disclosure.
FIG. 4B illustrates an example of quantization bin size levels used to achieve different compression bitrates in which bins in quantization bin size levels have uneven sizes, according to aspects of the present disclosure.

The dequantized latent may be obtained by multiplying s after the quantization bin in which y/s is quantized, according to the equation:

$$y(s) \triangleq \left\lceil\frac{y-\mu}{s}\right\rceil s + \mu,$$

where $\mu$ represents an estimated mean learned by a hyper-encoder. The prior probability of (y/s) used in entropy coding and generating a bitstream representation of the compressed content may be derived from the original prior density through the change of variables equation:

$$\mathbb{P}_{Y(s)}(y(s)) = \mathbb{P}_{\frac{Y(s)}{s}}\left(\frac{y(s)}{s}\right) = \mathbb{P}_{\frac{Y(s)}{s}}\left(\left\lceil\frac{y-\mu}{s}\right\rceil+\frac{\mu}{s}\right)$$

$$= \int_{\lceil(y-\mu)/s\rceil-1/2}^{\lceil(y-\mu)/s\rceil+1/2} p(y-\mu)/s(u)(du) = \int_{y^-s}^{y^+s} p_y(v)(dv)$$

where $$y^+(s) \triangleq y(s) + \frac{s}{2} \text{ and } y^-(s) \triangleq y(s) - \frac{s}{2}$$

and represent the upper and lower bounds of an effective quantization bin, respectively FIGS. 4A and 4B illustrate examples of quantization bin sizes used to achieve different compression bitrates, according to aspects of the present disclosure.

In particular, FIG. 4A illustrates a series 400A of quantization levels with bin sizes $s_1$ and $s_2$ in which a latent code y can be mapped. Because $s_1$ and $s_2$ are different bin sizes, each quantization level may have different midpoints to which values can be quantized or rounded and different numbers of differently sized bins. Thus, the quantization level associated with bin size $s_1$ may have a lower effective bitrate than the quantization level associated with bin size $s_2$. Data compressed using quantization level $s_1$ may thus be smaller than data compressed using quantization level $s_2$ but may have lower quality when decompressed.

More generally, for a number N of quantization bin sizes in a series of quantization bin sizes, where a first quantization bin size Si corresponds to the largest quantization bin size and successive quantization bin sizes decrease towards the quantization bin size of $s_N$, the quantization bin sizes can be represented according to $s_1 > s_2 > s_3 > \ldots > s_N$. Correspondingly, the bitrate for the quantization bin sizes can be represented according to $\beta_1 < \beta_2 < \beta_3 < \ldots < \beta_N$.

In some aspects, bin sizes for any level n of quantization in the set of quantization levels {1, 2, ..., N} need not be consistent throughout the level of quantization. For example, FIG. 4B illustrates a series 400B of quantization levels 402, 404, 406, 408 with different quantization bin sizes. As illustrated, quantization level 402 may have a coarsest quantization bin size, quantization level 404 may have a first intermediate quantization bin size, quantization level 406 may have a second intermediate quantization bin size finer than the bin size of quantization level 404, and quantization level 408 finest quantization bin size.

Further, FIG. 4B depicts that quantization bin sizes may be different even within a quantization level. For example, in the quantization level 406, a center bin 416 may have a different size from other bins. It should be noted that while quantization level 404 illustrates a single bin having a different size from other bins, a quantization level may include bins of varying sizes and at varying locations. For example, a quantization level may have a large center bin and progressively smaller bins on either side of a center point (e.g., smaller non-center bins and a larger center bin). In another example, a quantization level may have large bins interposed between smaller bins. Generally, using a larger center bin choice may improve compression performance (e.g., improve the quality of a decompressed image by reducing distortion relative to the original version of the image) because, in a Gaussian distribution, a majority of the probability mass under a probability distribution 300 may be centered around a center point of the probability distribution. Thus, increasing the bin size around the center point of the probability distribution may have a larger impact on rate reduction (e.g., where rate is defined according to the equation:

$$\frac{1}{\log(Y_n)}$$

than increasing the bin size for non-center bins.

Figure 5:
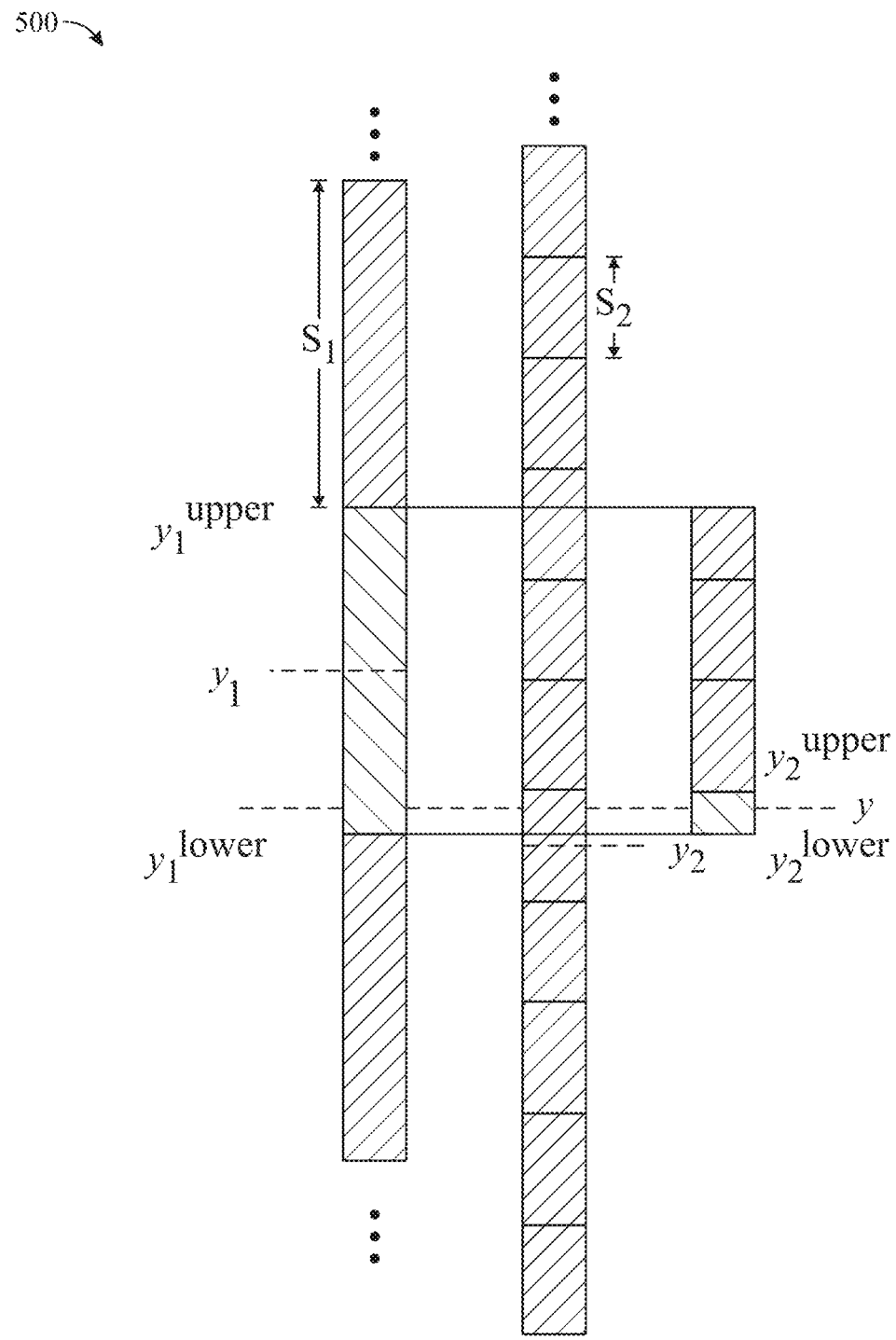
FIG. 5 illustrates an example of nested quantization based on quantized codes in finer quantization bin sizes conditioned on quantized codes in coarser quantization bin sizes, according to aspects of the present disclosure.

FIG. 5 illustrates an example of nested quantization 500. Generally, nested quantization may allow for quantization of data using finer quantization bin sizes to be defined as conditioned on quantized codes in coarser quantization bin sizes. As discussed above, quantization of a latent space code y using quantization bin size $s_1$ generally results in a lower bitrate than quantization of a latent space code y using a smaller quantization bin size $s_2$. In this case, given a latent space code y, it can be seen that y can be quantized to a value $y_1$ having an upper bound $y_1^{upper}$ and a lower bound $y_1^{lower}$ for a quantization level with a quantization bin size of $s_1$. Correspondingly, for a quantization level with a quantization bin size $s_2$, y can be quantized to a value $y_2$ that is a midpoint of a quantization bin at the quantization level with the quantization bin size $s_2$. The resulting effective quantization bin may thus have an upper bound $y_2^{upper}$ and a lower bound $y_2^{lower}$ based on an intersection of boundaries of the quantization bins in which y is quantized. In this example, the effective quantization bin may have an upper bound of the upper bound of the quantization bin in which $y_2$ lies and a lower bound of the quantization bin in which $y_1$ lies.

More generally, to scale y to any quantization level i, $y_i$ may be defined by the equation:

$$y_i = s_i * \text{round}\left(\frac{y}{s_i}\right),$$

where the round function rounds $$\frac{y}{s_i}$$

to a nearest value (e.g., one of the quantized values defined at a given quantization level). The probability mass of $y_i$ may be represented by the equation:

$$P(y_i) = \mathbb{P}\left(\left[y_i - \frac{s_i}{2}, y_i + \frac{s_i}{2}\right]\right) \triangleq CDF\left(y_i + \frac{s_i}{2}\right) - CDF\left(y_i - \frac{s_i}{2}\right)$$

where $$y_i + \frac{s_i}{2}$$

represents an upper bound of the bin in which $y_i$ lies in the quantization grid, and where $$y_i - \frac{s_i}{2}$$

represents a lower bound pf the bin in which $y_i$ lies in the quantization grid.

In nested quantization, the probability mass of y quantized at the lowest quantization level (and thus, largest quantization bin size) may represent an initial quantization of the latent space code y for content x to be compressed. That is, the probability mass of y corresponds to the probability mass associated with one of the codes at the lowest quantization level into which y is mapped. Subsequent quantization of y to higher quantization levels (and thus, smaller quantization bin sizes and higher bitrates) may be calculated as a conditional probability mass conditioned on a coarser quantized value. For example, to quantize y using the second quantization bin size $s_2$, the probability mass of the quantized value $y_2$ conditioned on $y_1$ may be represented by the equation:

$$P(y_2 | y_1) = \frac{\mathbb{P}\left(\left[\max\left(y_2 - \frac{s_2}{2}, y_1 - \frac{s_1}{2}\right), \min\left(y_2 + \frac{s_2}{2}, y_1 + \frac{s_1}{2}\right)\right]\right)}{\mathbb{P}\left(\left[y_1 - \frac{s_1}{2}, y_1 + \frac{s_1}{2}\right]\right)}.$$

The number of bits used to represent data compressed using a finest quantization bin (e.g., for the quantization level having a smallest bin size and thus a largest bitrate) may be represented according to the equation $$\log\frac{1}{P(y_N)}.$$

The bit allocation may be decomposed into a chain of conditional probabilities such that the bit allocation for a value quantized to the finest quantization bin may be represented by a summation of conditional probabilities for other quantization bins, conditioned by preceding quantization bins. Thus, the bit allocation for the finest quantization bin may be represented by the equation:

$$\log\frac{1}{P(y_N)} = \log\frac{1}{P(y_1)} + \log\frac{1}{P(y_2 | y_1)} + \ldots + \log\frac{1}{P(y_N | y_1, y_2, \ldots, y_{N-1})}.$$

That is, for any given quantization bin size, the conditional probability for that quantization bin size maybe conditioned on conditional probabilities calculated for quantization bin sizes larger than that quantization bin size. Because the conditional probability of the quantized code [y] at any given quantization bin size may be conditioned on conditional probabilities of codes in larger quantization bin sizes, a code at any given quantization bin size may be derived based on the chain rule using the codes generated at larger quantization bin sizes. Thus, a single model can be used to encode and compress content at any compression bitrate, with a plurality of supported compression bitrates embedded in the compressed content. Further, compressed content may be decompressed from any given compression bitrate, which may allow devices to decompress data, for example, based on the computing capabilities of each device.

Generally, in nested quantization, encoding may occur in N stages (where N represents the number of quantization levels in which y may be encoded). Generally, y may be quantized initially using a quantization level associated with a coarsest quantization bin, and the quantization of y may be iteratively refined using progressively finer quantization bin sizes. Generally, the extra information resulting from quantizing y to a quantization level with a finer quantization bin size may be represented by the conditional probability equation:

$$\mathbb{P}(y(s_n) | y(s_{n+1})) = \frac{P(I_n)}{P(I_{n+1})}$$

where $P(I) \triangleq \int_{v \in I} p_y(v)dv$ and $I_{n-1}$ is defined as an interactive intersection of quantization bins: $I_N \triangleq \lceil y^-(s_N), y^+(s_N) \rfloor$ and $I_n \triangleq I_{n+1} \cap \lceil y^-(s_n), y^+(s_n) \rfloor$ for $1 \leq n \leq N$.

In some aspects, a naïve approach may result in increased complexity (as discussed in further detail below) and a codeword length that may be larger than the codeword length generated at the finest quantization level. For example, taking a naïve approach, a code generated by the N stages forms a bitstream that embeds data at data in N different bitrates, and the total length of the bitstream may be represented by the equation:

$$\log\frac{1}{\mathbb{P}(y(s_n))} + \sum_{1 \leq n < N} \log\frac{1}{\mathbb{P}(y(s_n) | y(s_{n+1}))} = \log\frac{1}{P(I_1)}$$

where $$\log\frac{1}{\mathbb{P}(y(s_n))}$$

represents the codeword length with respect to a coarsest quantization bin and $$\log\frac{1}{\mathbb{P}(y(s_n) | y(s_{n+1}))}$$

represents the codeword length with respect to refined information from finer quantization bins up to the $N^{th}$ quantization bin (e.g., the finest quantization bin). In this case, the conditional probability equation discussed above may entail tracking of intersected quantization boundaries, and the sum of codeword lengths $$\log \frac{1}{P(I_1)}$$

may be larger than the codeword length with respect to the finest quantization level, represented by the equation $$\log \frac{1}{\mathbb{P}(y(s_N))}.$$

To reduce complexity, as discussed below, a set of fully nested quantization levels may be defined such that the center points of quantization bins at a coarser quantization level are a subset of the center points of quantization bins at a finer quantization level. With fully nested quantization levels, the set of grid points in a coarser quantization bin may be a subset of points in a finer quantization bin. That is, a quantization may be defined according to the equation:

$$I_n = I_{n+1} \cap [y^-(s_k), y^+(s_k)] = [y^-(s_k), y^+(s_k)].$$

This may simply the bitstream length equation discussed above into the following equation:

$$\log \frac{1}{\mathbb{P}(y(s_n))} + \sum_{1 \leq n < N} \log \frac{\mathbb{P}(y(s_{n+1}))}{\mathbb{P}(y(s_n))} = \log \frac{1}{P(y(s_1))}$$

By using a set of fully nested quantization levels, the performance of the highest bit rate model in a coding model may be preserved, while simplifying the process of compressing data.

In some aspects, choices of scaling factors may effectively implement various types of compression. For example, when $s_{i-1} = 2s_i$, the resulting compression scheme may be binary bit-plane coding. When $s_{i-1}$ is an integer multiple of $s_i$, calculating the upper and lower bounds of a quantization bin may be a simple calculation and may thus allow for less processor-intensive compression and decompression of data.

Example Methods for Progressive Coding of Data for Data Compression

Figure 6:
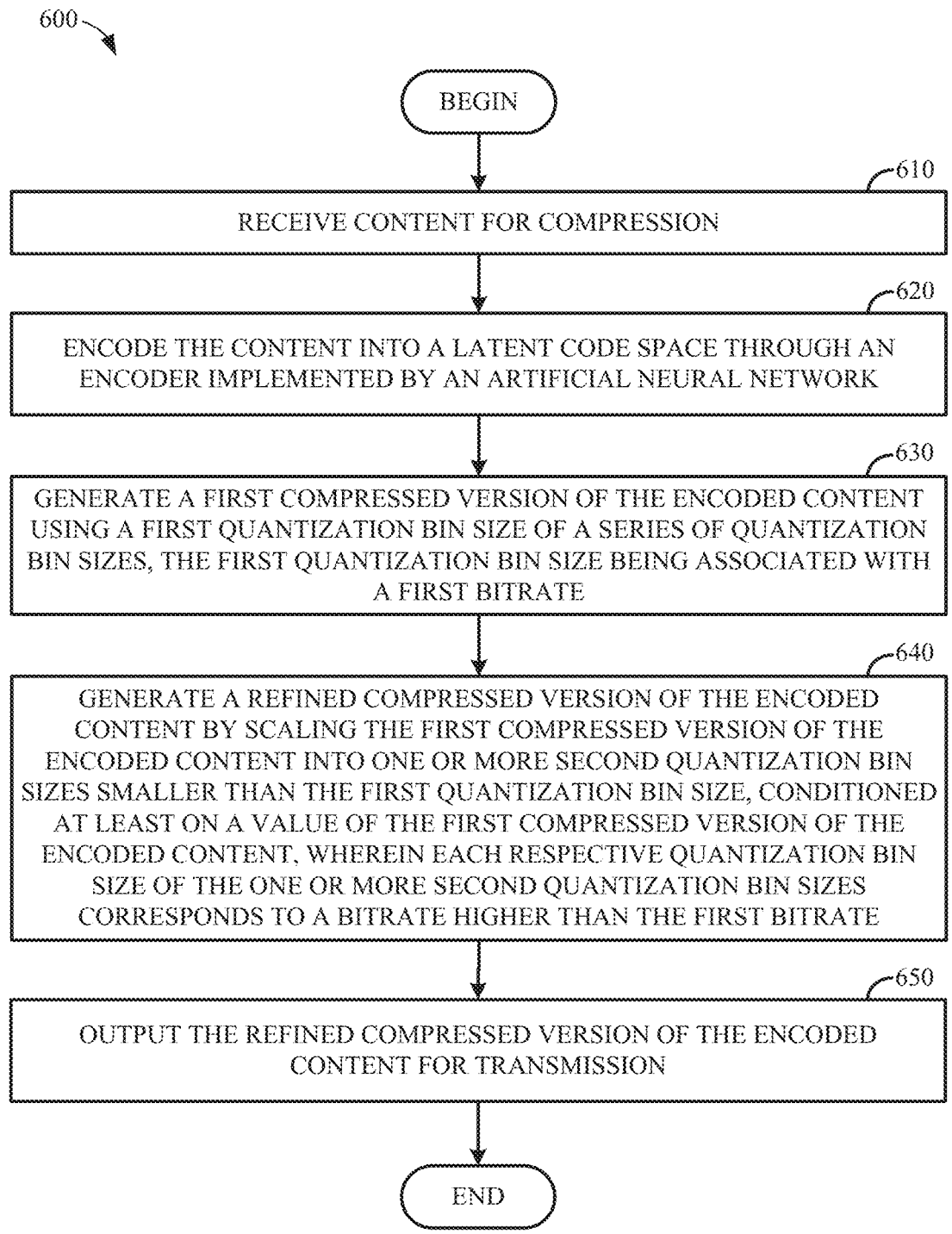
FIG. 6 illustrates example operations for compressing received content through a compression pipeline using progressive coding, according to aspects of the present disclosure.

FIG. 6 illustrates example operations 600 that may be performed by a system to compress received content through a compression pipeline, such as pipelines 100 or 200 illustrated in FIG. 1 or 2, using progressive coding. Operations 600 may be performed by a system with one or more processors, such as system 1200 in FIG. 12, implementing a compression pipeline including a neural network-based encoder and a quantizer implemented a learned, nested quantization scheme.

As illustrated, operations 600 may begin at block 610 with receiving content for compression. The received content may be single channel content, such as a stream of data, or multi-channel content (i.e., content having multiple data channels) in which different channels can be compressed independently. Multi-channel content may include, for example, audio content including a plurality of spatial channels (left/right stereo, surround sound content, etc.), video content including luminance and/or chrominance channels (YPbPr, RGB, etc.), audiovisual content including independent visual channels and audio channels, or the like.

At block 620, the content is encoded into a latent code space (e.g., through an encoder 112 ($g_a$) illustrated in FIG. 1). To encode the content into the latent code space, an encoder implemented by an artificial neural network that is trained to generate a latent space representation of the content may be used. In some aspects, the encoding of received content x into a code y in the latent code space may be a lossless mapping of the received content x to a code y. Compression, and resulting loss (or distortion) relative to the original received content x, may be achieved by quantizing the code y.

At block 630, a first compressed version of the encoded content is generated (e.g., through a quantizer 114 (Q) illustrated in FIG. 1). To generate the first compressed version of the encoded content, the code y into which the content is encoded may be quantized using a first quantization bin size of a set of quantization bin sizes, which is associated with a first bitrate. For example, the first quantization bin size may be a coarsest quantization bin size of a plurality of quantization bin sizes in the set of quantization bin sizes, and may result in compression at a lowest bitrate of the bitrates associated with the plurality of quantization bin sizes.

At block 640, a refined compressed version of the encoded content is generated (e.g., through a quantizer 114 (Q) illustrated in FIG. 1). In one example, to generate the refined compressed version of the encoded content, the first compressed version of the encoded content is scaled into one or more second quantization bin sizes smaller than the first quantization bin size, conditioned at least on a value of the encoded content. Generally, each respective quantization bin size of the one or more second quantization bin sizes corresponds to a bitrate higher than the first bitrate. That is, each respective quantization bin size of the one or more second quantization bin sizes may be smaller than the first quantization bin size.

At block 650, the refined compressed version of the encoded content is output for transmission (e.g., through entity coder 116 (EC) illustrated in FIG. 1).

Figure 7:
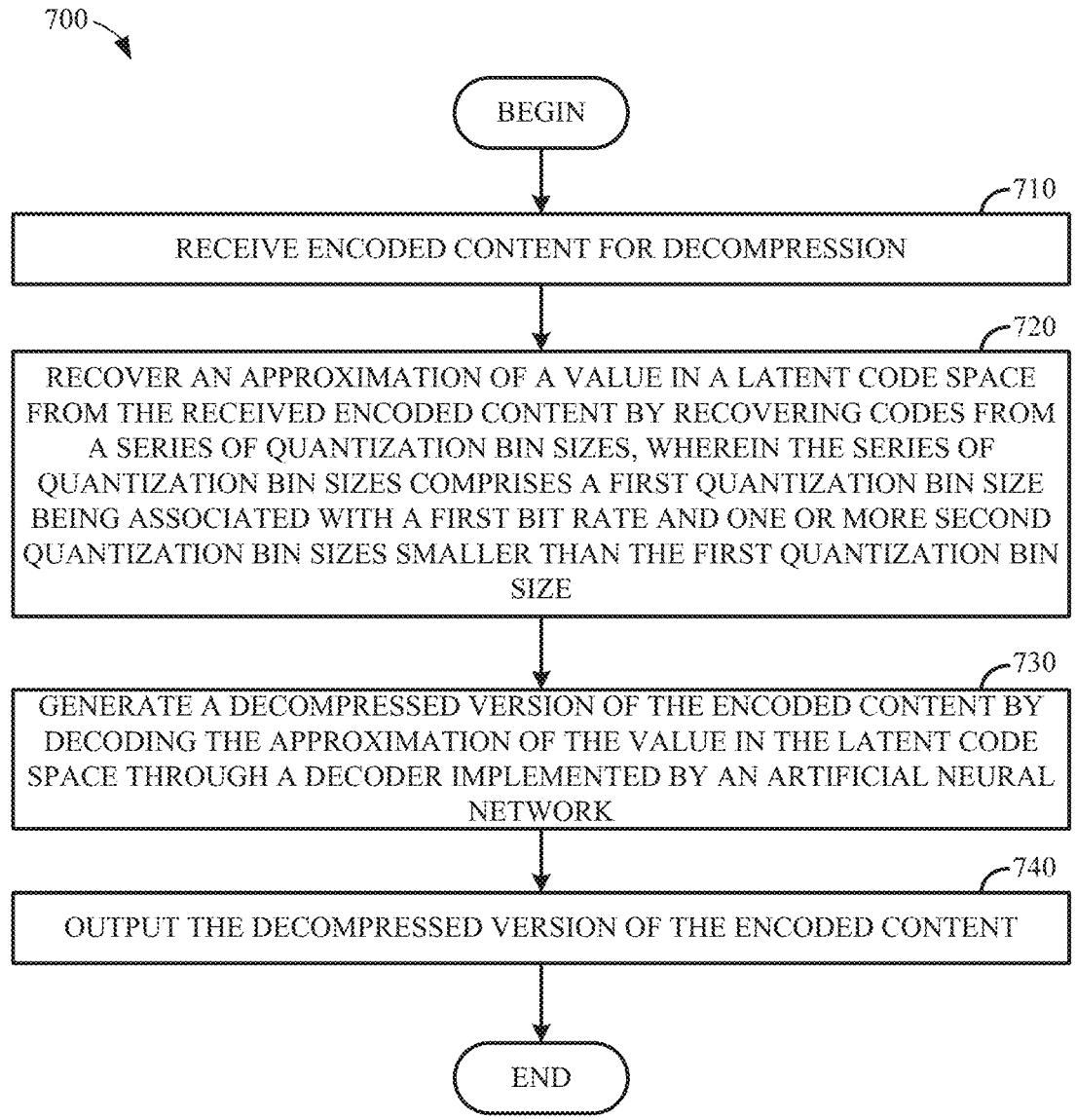
FIG. 7 illustrates example operations for decompressing encoded content, according to aspects of the present disclosure.

FIG. 7 illustrates example operations 700 that may be performed by a system to decompress encoded content. Operations 700 may be performed by a system with one or more processors, such as system 1200 in FIG. 12, implementing a compression pipeline including a neural network-based encoder and a quantizer implemented a learned, nested quantization scheme, such as pipelines 100 or 200 illustrated in FIG. 1 or 2.

As illustrated, operations 700 may begin at block 710, where encoded content is received for decompression.

At block 720, an approximation of a code in a latent code space is recovered from the received encoded content.

In some cases, the approximation of the code ŷ may be recovered by recovering codes from a series of quantization bin sizes. The approximation of the code ŷ may be recovered, for example, by an inverse quantizer 124 ($Q^{-1}$) illustrated in FIG. 1. The series of quantization bin sizes may include a first quantization bin size being associated with a first bitrate and one or more second quantization bin sizes smaller than the first quantization bin size.

Generally, the series of quantization bin sizes may allow for the decompression of content using a single model to any bitrate based on an acceptable amount of distortion in the decompressed version of the encoded content. As discussed above, codes representing compressed data may be recovered from any quantization level using the chain rule, where a code at a given quantization level may be defined as codes conditioned upon codes obtained at lower quantization levels (e.g., quantization levels with quantization bin sizes smaller than that at the given quantization level). An amount of distortion in the decompressed version of the encoded content may be inversely proportional to the bitrate associated with the smallest quantization bin size used to recover the approximation of the code. That is, the lowest bitrate, associated with the largest quantization bin size of the series of quantization bin sizes, may have the highest amount of distortion, and distortion may decrease as successively smaller quantization bin sizes are used in recovering the approximation of the code.

At block 730, a decompressed version of the encoded content is generated by decoding the approximation of the code in the latent code space through a decoder implemented by an artificial neural network, such as a decoder 126 ($g_s$) illustrated in FIG. 1. The decoder implemented by the artificial neural network may be, for example, complementary to the encoder implemented by an artificial neural network and used to encode content into the latent code space as discussed above with respect to FIG. 6.

At block 740, the decompressed version of the encoded content is output. In some aspects, the decompressed version of the encoded content can be output to one or more output devices, such as a display or an audio device connected with or integral to the system, for playback to a user of the device. In some aspects, the decompressed version of the encoded content can be output to one or more other computing systems for output to users of those computing systems.

In some aspects, progressive coding may be used to compress multi-channel data using differing levels of compression (and thus, achieving different levels of distortion) for each channel in the multi-channel data. As discussed, the channels in multi-channel data may include luminance and/or chrominance channels in visual content, spatial sound information in multi-channel audio, and the like. Each channel may have a differing amount of data or differing impact on a final audiovisual rendition of the content when decompressed, and thus, it may be useful to encode (compress) each channel using a different amount of compression. A choice of bitrate to use in compressing or decompressing data may be made based on congestion control or bandwidth adaptation functions controlled, for example, by an application layer in a network stack. For example, a content server can select lower bitrates (e.g., compression using larger quantization bin sizes) if the content server detects low bandwidth between the content server and a requesting device; similarly, the content server can select higher bitrates (e.g., compression using smaller quantization bin sizes) if the content server detects high bandwidth between the content server and the requesting device.

For example, in multi-channel video data in the YPbPr space (i.e., having a luminance channel and two color channels), the luminance channel may be considered the most important channel, as the luminance channel carries the most visual information in the multi-channel video data. Thus, it may be desirable to encode the luminance channel using a highest bitrate and to encode the color channels using lower bitrates to balance quality and an amount of compression applied to the video content. Thus, in encoding multi-channel video data in the YPbPr space, a neural network may independently encode each of the Y, Pb, and Pr channels into different latent space codes $y_Y$, $y_{Pb}$, and $y_{Pr}$, and each of these latent space codes may be encoded independently.

In another example, in image data carried in multiple color data channels (e.g., in RGB chrominance color spaces), some color data may have a larger impact on the visual rendition of the decompressed content than other color data. For example, based on a priori known sensitivity to different colors, one color channel may be encoded using higher bitrate compression than other channels. For RGB data, for example, the green color channel may be compressed using a higher bitrate than that used for the red and blue color channels, as the human eye may be known to be more sensitive to green color data than to other color data.

To perform channel-wise progressive coding, channels may be ordered according to an amount of compression to be applied to each channel. The ordering may be determined based on a difference in distortion, $\Delta D$, and a difference in bitrate, $\Delta R$. For example, the ordering may be based on the ratio $$\frac{\Delta D}{\Delta R}$$

calculated for each channel, which may correspond to a compression priority associated with each channel. To determine the difference in distortion $\Delta D$ for a channel, a system can decode the encoded input twice: once including the channel, and once excluding the channel. The amount of distortion calculated for the decompression may thus represent the amount of distortion that would result from excluding a channel from decompression at a given bitrate. To determine the difference in bitrate $\Delta R$, the system can calculate the difference in the number of bits generated for compression at a first bitrate and compression at a second bitrate.

Example Channel-Wise Progressive Coding

Figure 8:
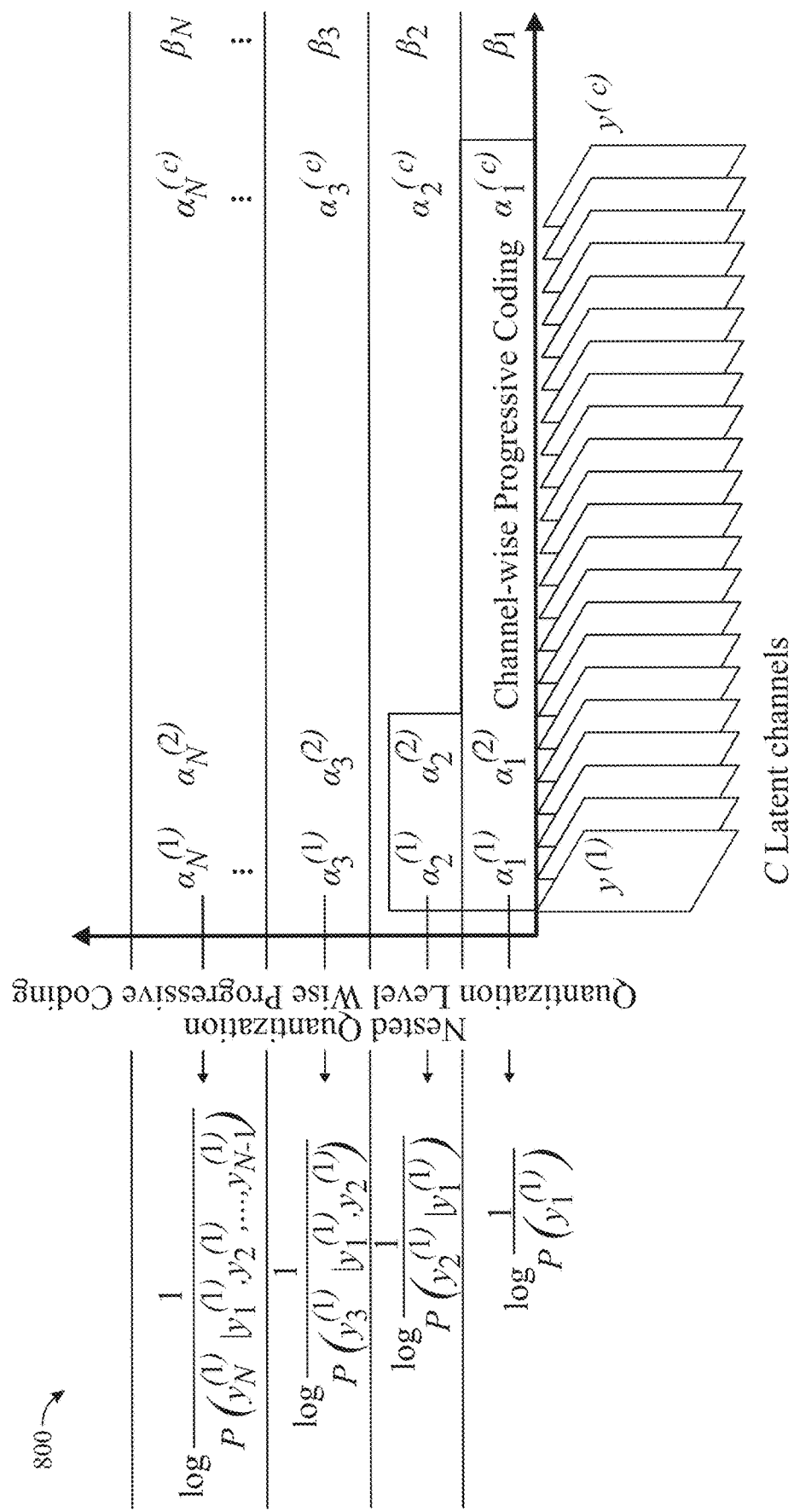
FIG. 8 illustrates an example of channel-wise progressive coding using different bitrates for different channels, according to aspects of the present disclosure.

FIG. 8 illustrates an example of channel-wise progressive coding 800 using different bitrates for different channels.

As illustrated, in coding 800, a bitstream may be generated for each of C channels. In these channels 1 through C, the quantization bin size for a code generated for each of the channel c at a given bitrate b may be represented as ag. The C channels may be ordered, as discussed above, according to increasing or decreasing amounts of compression that are to be used to represent each channel c (i.e., based on $$\frac{\Delta D}{\Delta R}$$

calculated for each channel). As discussed above with respect to FIGS. 3 through 5, a coding for a channel may be represented as a nested quantization with a sequence of different quantization bin sizes. In the depicted example, $\alpha_1^c$ corresponds to a coarsest quantization bin size of the plurality of quantization bin sizes, and $\alpha_2^c, \ldots, \alpha_N^c$ may correspond to increasingly finer quantization bin sizes.

For each channel, the code $y^c$ in the latent space representation of the channel can be compressed at the coarsest quantization bin size and output for transmission. To achieve nested quantization for each channel, the code $y^c$ can be compressed at finer quantization bin sizes, conditioned on the quantized value of y at coarser bin sizes, and output for transmission. By outputting additional code information $y^c$ for finer quantization bin sizes, the quality of compressed content can be progressively improved from a baseline amount of compression corresponding to compression at the coarsest quantization bin size, and the amount of improvement can be controlled based on the amount of additional codes $y^c$ (i.e., generated for progressively finer quantization bin sizes) output for transmission.

In some cases, additional progressive coding can be achieved by outputting additional quantization information for some of the channels c in the set of C channels.

For example, each of the channels c may be compressed at the coarsest quantization bin size and output for transmission. For channels having larger impacts on the resulting quality of the decompressed data, additional codes $y^c$ generated for increasingly finer quantization bin sizes may be output (e.g., for a subset of the channels c). For any quantization level beyond a level associated with a coarsest quantization bin size, codes may be generated for a subset of the C channels so that additional compression is not performed for channels having small impacts on the resulting quality of the decompressed data. The subset of the C channels generated for any quantization level N may be selected, for example, using a greedy technique (e.g., for each one-level increase in quantization level, decreasing the number of channels encoded using the increased quantization level by one), or by applying thresholding techniques to determine, based on $$\frac{\Delta D}{\Delta R}$$

calculated for each channel, which channels for which codes y are to be generated using the increased quantization level (and corresponding decreased quantization bin size). By compressing content in such a manner, progressive coding may be achieved on a per-channel and per-quantization-level basis.

In FIG. 8, each level illustrated in coding 800 represents a different quantization level and corresponding bitrate used to compress the C channels. As illustrated, each of the C channels may be encoded and compressed using a lowest quantization level (e.g., quantization level 1, for which a value may be represented by the equation $$\log\frac{1}{P(y_1^{(n)})},$$

where n represents one of the C channels). As channels increase in importance, these channels may be encoded and compressed using higher quantization levels, represented by equations in which a value of a code is represented by a probability distribution at an $n^{th}$ quantization level, conditioned by the codes at the lower quantization levels (e.g., codes at quantization levels 1 through n−1). For example, the shading in coding 800 indicates that channels 1 and 2 are encoded and compressed at a second quantization level for which a value may be represented by the equation $$\log\frac{1}{P(y_2^{(n)} \mid y_1^{(n)})},$$

but no other channels are encoded and compressed at this quantization level.

Example Quantization Grids for Progressive Coding in Data Compression

Figure 9:
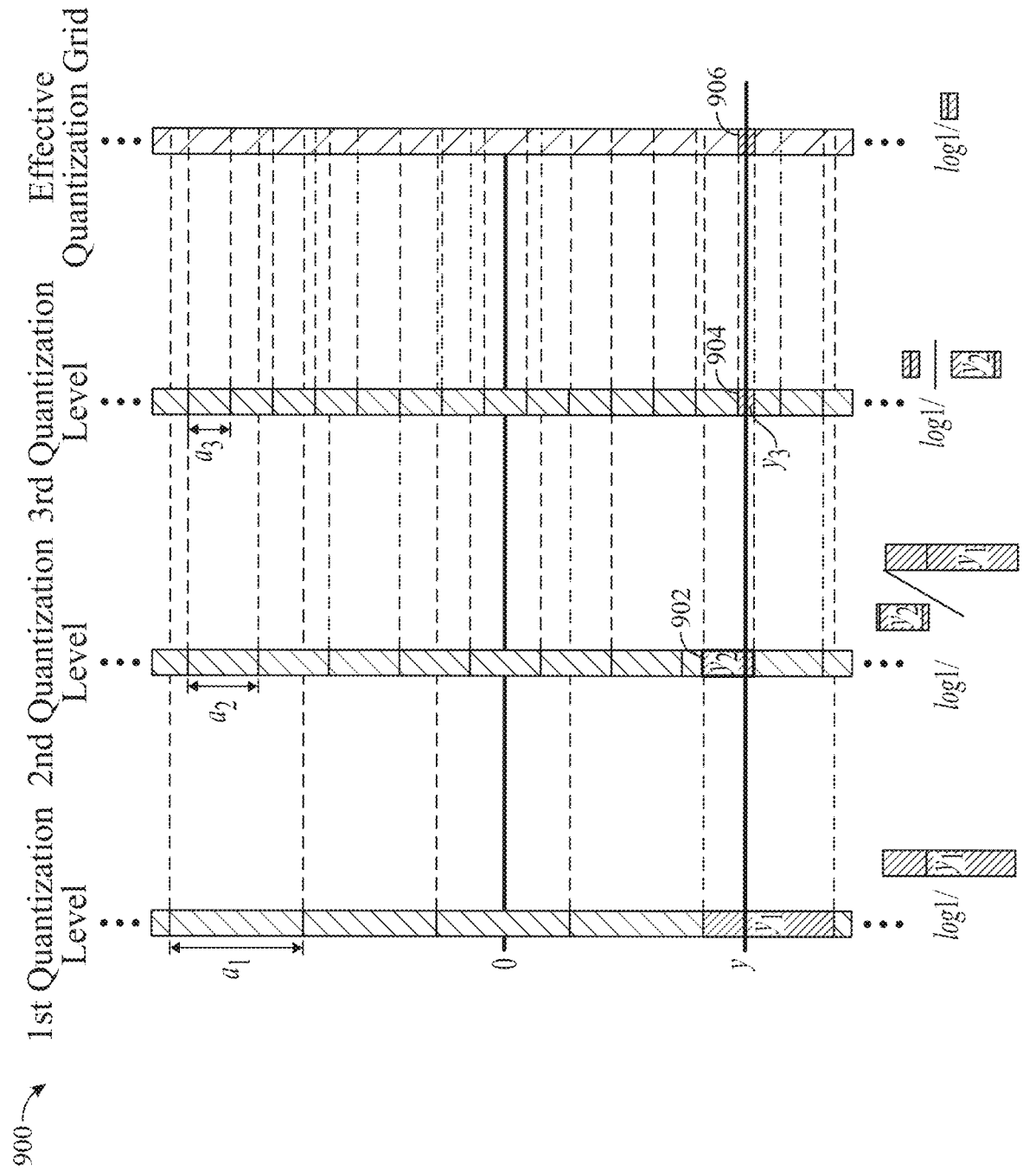
FIG. 9 illustrates an effective quantization grid for progressive coding, according to aspects of the present disclosure.

FIG. 9 illustrates an example of an effective quantization grid 900 for progressive coding of content. As illustrated, three quantization levels are used to quantize a latent space code y representing content x. The first quantization level is associated with a quantization bin size $s_1$, the second quantization level is associated with a quantization bin size $s_2$, and the third quantization level is associated with a quantization bin size $s_3$. For the code $y_1$ generated by quantizing y at the quantization level associated with quantization bin size $s_1$, the number of bits to be transmitted may be represented according to the equation $$\log\frac{1}{y_1},$$

since code $y_1$ generated using the coarsest quantization level in the set of quantization levels. At the next level, y may be represented by the intersection 902 of the upper bound of the quantization bin in which $y_1$ is located and the lower bound of the quantization bin in which $y_2$ is located. Thus, the effective quantization bin at the second quantization level may be smaller than the quantization bin size at the second quantization level. The number of additional bits to transmit to achieve nested quantization at the $2^{nd}$ quantization level may be represented by the equation $$\log\frac{1}{\frac{\text{intersection 902}}{y_1}}.$$

At still a further quantization level, the code $y_3$ may be represented by the intersection 904 of the upper bound of the bin in which $y_3$ is located and the lower bound of $y_2$ and may be represented by the equation:

$$\log\frac{1}{\frac{\text{intersection 902}}{\text{intersection 904}}}.$$

Thus, the effective quantization bin size may be finer than the finest bin used in compressing content. The sum of the bits transmitted may thus be represented by the equation $$\log\frac{1}{\text{intersectionOfBins}},$$

where intersectionOfBins represents the smallest effective quantization bin 906 formed by a boundary of the $n^{th}$ quantization bin and a boundary of the n−$1^{th}$ quantization bin, which may precede the $n^{th}$ quantization bin.

There may be a performance degradation in the compression of data when applying nested quantization naively, because an effective quantization bin may be smaller than the finest bin actually used to quantize latent space representations y of content x. The performance degradation may be seen in reduced increases in quality, measured by peak signal-to-noise ratio (PSNR), for increasing effective compression bitrates.

Figure 10:
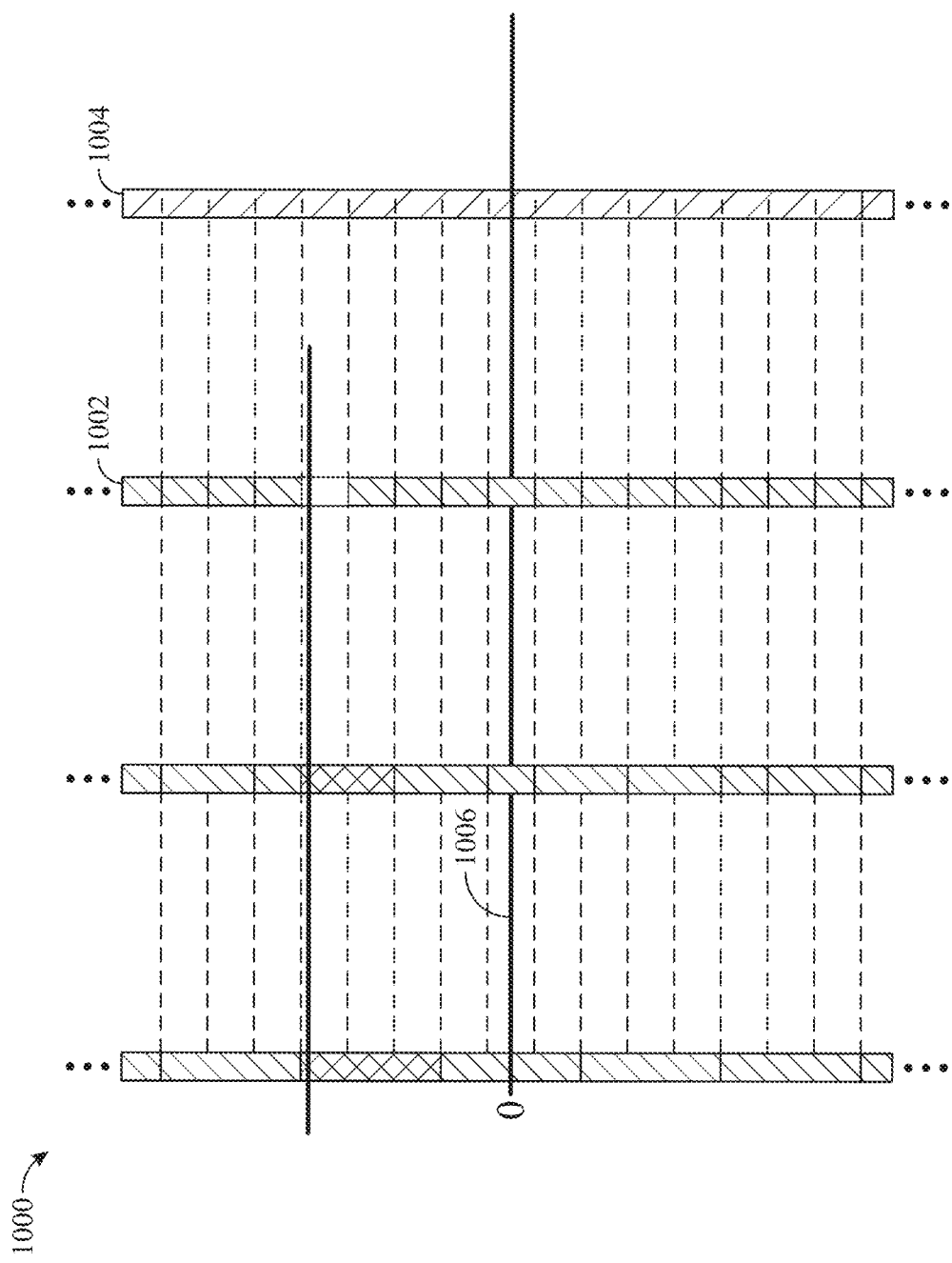
FIG. 10 illustrates a quantization grid for progressive coding with alignment to a finest quantization grid, according to aspects of the present disclosure.

To mitigate performance degradation from applying nested quantization naively, the quantization grid 1000 for progressive coding may be aligned to a finest quantization grid 1002 as illustrated in FIG. 10.

To align the quantization grid 1004 to a grid 1002 for the finest quantization grid size, multi-pass quantization may be used to quantize a plurality of coarser quantization bins based on the finest quantization bin size. By applying multi-pass quantization, as the intersection of smaller quantization beams is identified (e.g., as effective quantization bin 906 is identified), the effective quantization bin size is no smaller than the finest quantization bin size to simplify processing and avoid performance degradation from the use of variable effective quantization bin sizes. The midpoint 1006 of the quantization grid 1000 may be in the midpoint of a middle quantization bin in the grids for each of the quantization levels and in the midpoint of a middle quantization bin in the effective quantization grid 1004.

Figure 11:
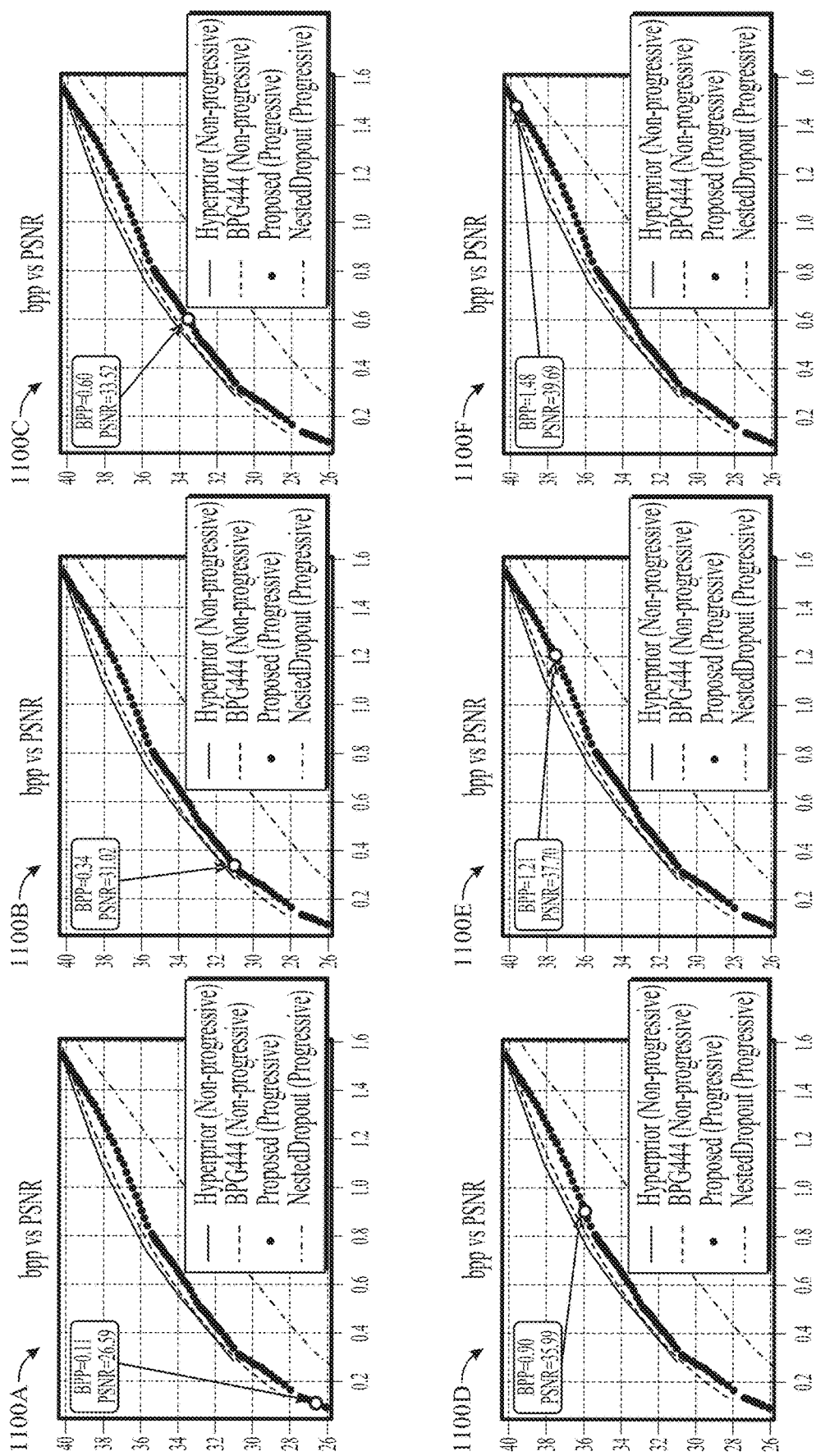
FIG. 11 illustrates example results of data compression using progressive coding, according to aspects of the present disclosure.

FIG. 11 illustrates example results of data compression using progressive coding.

Graphs 1100A-1100F illustrate relationships between the PSNR per pixel and bitrate for various compression techniques used to compress a sample image. As illustrated in graph 1100A, compression using the progressive coding techniques described herein may provide for a PSNR of 26.59 dB at low bitrate of 0.11 bits per pixel used to compress the sample image. Graph 1100B illustrates that the progressive coding techniques described herein may provide for a PSNR of 31.02 dB at a bitrate of 0.34 bits per pixel used to compress the sample image. Graph 1100C illustrates that the progressive coding techniques described herein may provide for a PSNR of 33.52 dB at a bitrate of 0.60 bits per pixel used to compress the sample image. Graph 1100D illustrates that the progressive coding techniques described herein may provide for a PSNR of 35.99 dB at a bitrate of 0.90 bits per pixel used to compress the sample image. Graph 1100E illustrates that the progressive coding techniques described herein may provide for a PSNR of 37.70 dB at a bitrate of 1.21 bits per pixel used to compress the sample image. Finally, graph 1100F illustrates that the progressive coding techniques described herein may provide for a PSNR of 39.69 dB at a bitrate of 1.48 bits per pixel used to compress the sample image. In these examples, it can be seen that, compared to nested dropout progressive coding, the quality of the compressed image (represented by a PSNR measurement over the compressed image) is higher for each effective bitrate. Further, for each effective bitrate, the quality of the compressed image may approach the quality of compressed images generated using various non-progressive coding schemes in which a priori defined models are used for each bitrate used in compressing data.

Example Coding Unit Ordering for Progressive Data Compression

In some aspects, data being compressed using the techniques described herein may be divided into multiple coding units, with each coding unit being able to be compressed independently. A coding unit may be, for example, a channel, a pixel in an image (e.g., data for each of a plurality of channels at a specific location in an image or video content), blocks of data (e.g., one or more channels for an n×m pixel block in an image or video content), or a single element (e.g., data for a single channel at a specific location in an image or video content). To facilitate progressive coding, and reflecting that each coding unit may have different amounts of information and different sensitivity to compression loss, each coding unit may be independently incrementally refined. Progressive coding may be divided into two phases. A first phase encodes latent variables (e.g., a code y representing an input x generated by an artificial neural network-based encoder) from a largest quantization bin (e.g., a lowest quantization level) to a smallest quantization bin (e.g., a highest quantization bin). In a second phase, refinements between adjacent quantization levels may be made incremental on a per-coding-unit basis so that each truncation point in a resulting embedded bitstream, representing boundaries between coding units, is associated with an incremental change in quantization level.

Operationally, a continuous latent may be encoded from an infinitely large quantization bin so that the latent variables are each quantized to a given midpoint value. As a result, a dequantized latent to be passed to a decoder may be a prior mean. A coding unit ordering for refinement may be discovered from a prior quantization so that the coding unit in a current quantization bin may be decoded at the appropriate quantization bin. Based on the coding unit ordering, coding units may be refined from the largest quantization bin to the smallest quantization bin. To simplify processing, coding may be ordered such that the coding units encoded using the highest quantization levels (and corresponding largest quantization bin sizes) are coded first, and coding units encoded using lower quantization levels (and corresponding smaller quantization bin sizes) are encoded after the coding units using the highest quantization levels.

In a progressive coding scheme, a code y, which may be a tensor in a latent space, may be divided into N coding units $\{y_1, \ldots, y_N\}$. The elements in a coding unit may be refined together and may correspond to a truncation point, or a point in a space that achieves a lowest distortion (e.g., compression loss). For a tensor in the latent space with shape $(C, H, W)^4$, various codings may be defined. A single channel coding may correspond to a latent slice with size $(1, H, W)$; a single pixel coding may correspond to a latent slice with size $(C, 1, 1)$; and a single element coding may correspond to a latent slice with size $(1, 1, 1)$.

For a given compression order $\rho=(\rho_1, \ldots, \rho_N)$, ordered coding units $y_\rho=(y_{\rho 1}, \ldots, y_{\rho N})$ may be scaled individually from a scaling factor of $s_n$ to a scaling factor of $s_{n-1}$. In a mean space hyperprior model, the priors of latent elements may be conditioned on a hyper latent. The bitrate increase of refining the $t^{th}$ coding unit, $\Delta R$, with the scaling described herein may be defined according to the equation:

$$\Delta R(y_{\rho t}) = -\log \mathbb{P}_{(y_{\rho t}(s_{n-1})|y_{\rho t}(s_n))}$$

and may be calculated in parallel once the hyper latent in the hyperprior model is calculated.

A reduction in distortion, $\Delta D$, may also be calculated, and may depend on the other ordered coding units. The reduction in distortion, $\Delta D$, may be represented by the equation:

$$\Delta D(y_{\rho t}|y_\rho) = D(y_\rho(t-1)) - D(y_\rho(t))$$

where $y_\rho(t) = (y_{\rho \leq t}(s_{n-1}), y_{\rho > t}(s_n))$ and where $D(y) = MSE(x, g_s(y))$ and represents a distortion for the code y. Thus, refining an ordered latent using compression order p may result in a set of rate-distortion (R-D) points defined by the equation:

$$\mathcal{H}(\rho) = \left\{ \sum_{i \leq t} \Delta R(y_{\rho_i}), \sum_{i \leq t} \Delta D(y_{\rho_i}|y_\rho) \right\}_{t=1}^{N}.$$

Generally, an optimal order of ρ may be the order under which a convex hull of $\mathcal{H}(\rho)$ is better than that of other orders of ρ (e.g., is a Pareto optimal compression order).

Figure 12:
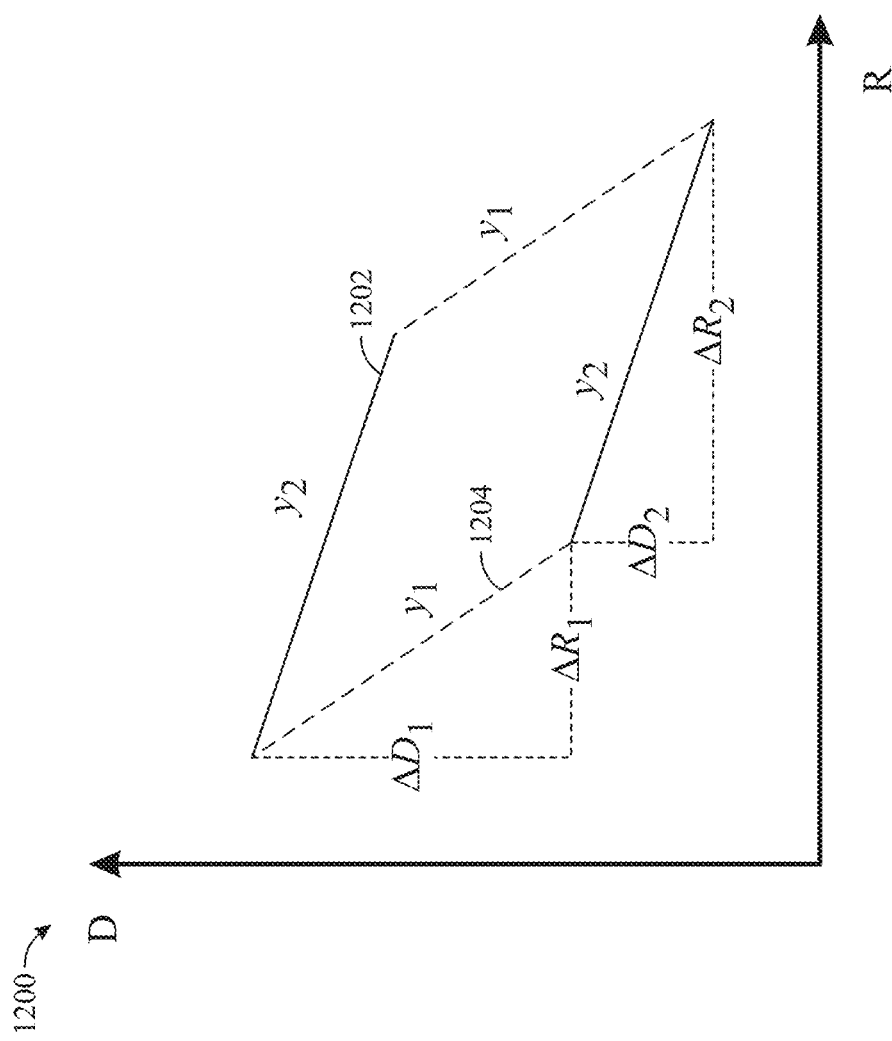
FIG. 12 illustrates example results of data compression based on different orderings of coding units, according to aspects of the present disclosure.

FIG. 12 illustrates relationships between the amount of coding loss involved in encoding content using different orderings. In graph 1200, for simplicity, two coding units, $y_1$ and $y_2$ are illustrated; however, it should be understood that data to be encoded may have any number of coding units. As illustrated, $y_1$ has a distortion-to-rate-change ratio of $$\frac{\Delta D_1}{\Delta R_1},$$

$y_2$ has a $$\frac{\Delta D_2}{\Delta R_2},$$

and the distortion-to-rate-change ratio for $y_1$ is greater than the distortion-to-rate-change ratio for $y_2$.

Distortion line 1202 illustrates coding loss where $y_2$ is encoded prior to $y_i$, and $y_2$ is encoded using a higher rate than $y_1$. In contrast, distortion line 1204 illustrates coding loss where $y_1$ is encoded prior to $y_2$, and $y_1$ is encoded using a higher rate than $y_2$. For compression using either ordering of $(y_1, y_2)$ or $(y_2, y_1)$, the total distortion/rate loss may be the same. However, because $y_2$ is less sensitive to changes in compression rate than $y_1$ (that is, a reduction in distortion for any given increase in compression rate for $y_2$ is less than that for $y_1$), it may be more efficient to encode $y_1$ prior to encoding $y_2$, as illustrated by distortion line 1204 being lower than distortion line 1202.

Thus, to compress content using progressive coding such that the content is encoded optimally, coding units may be sorted in descending order of their respective distortion-to-rate-change ratios. Additional complexity may be introduced where coding units are generated by a neural network-based encoder, such as encoder 112 illustrated in FIG. 1, as the amount of distortion loss may be dependent on the order in which units are coded. However, the distortion-to-rate-change ratio calculated for each coding unit in isolation may be treated as an approximation for purposes of ordering coding units for progressive coding.

Figure 13:
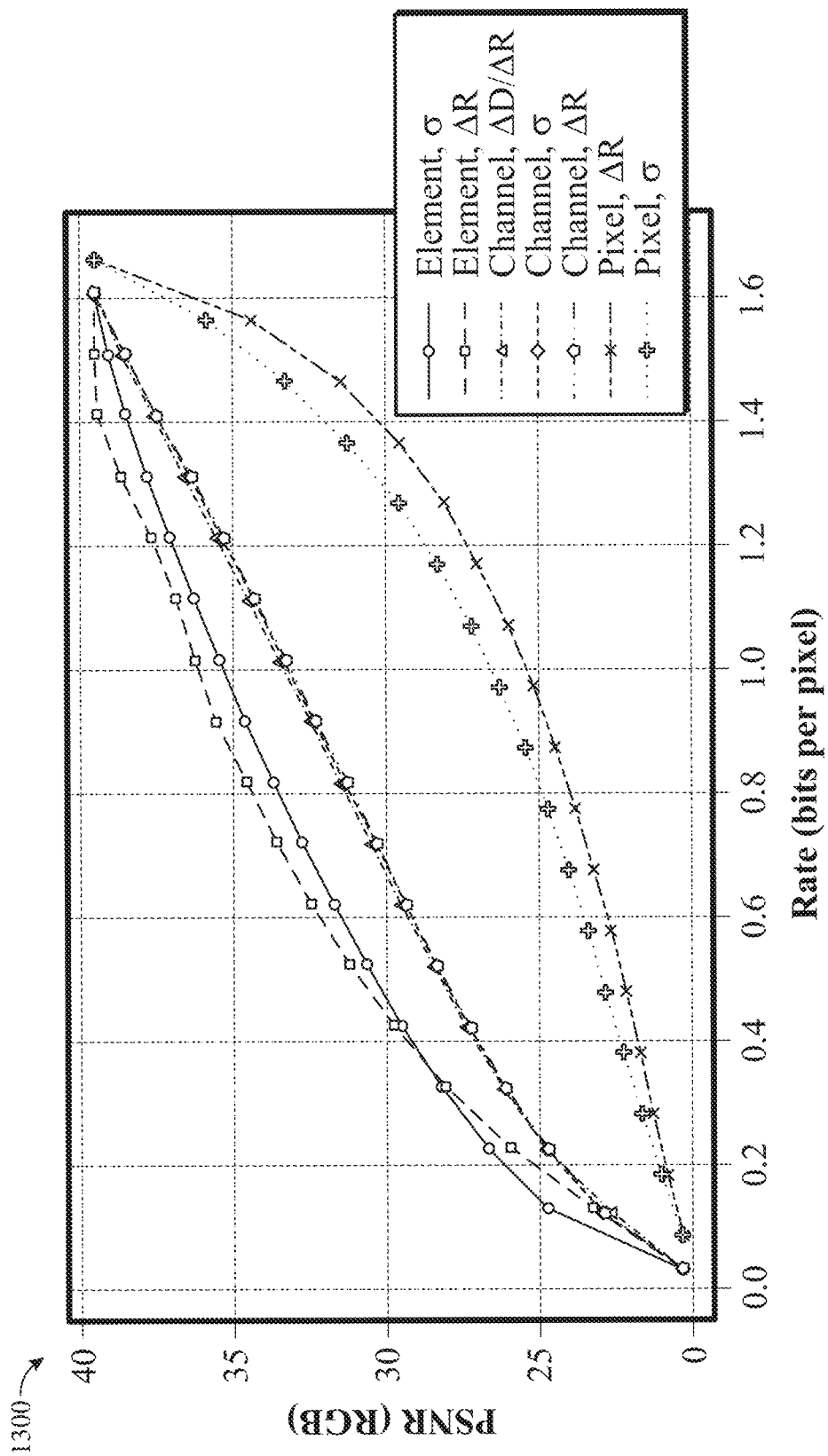
FIG. 13 illustrates example results of data compression using progressive coding and different orderings of coding units, according to aspects of the present disclosure.

FIG. 13 illustrates example results of data compression using progressive coding and different orderings of coding units.

Graph 1300 illustrates relationships between the peak signal-to-noise ratio (PSNR) per pixel and bitrate for progressive compression of data based on different coding units and sorting criteria.

As discussed, coding units may be defined for various granularities of data. For a latent with a shape defined by a number of channels C, a height dimension H, and a width dimension W (e.g., a still image or video frame defined as a plurality of color space channels and spatial dimensions), a coding unit may be one of the C channels, a single pixel, a block of pixels for one of the C channels, or a single element in the latent (e.g., the value of one of the C channels at a particular location in the image). The sorting criterion illustrated in graph 1300 includes rate-distortion importance, represented by the distortion-to-rate-change ratio $$\frac{\Delta D}{\Delta R}$$

for each coding block, rate difference ΔR, and a prior standard deviation σ.

As illustrated, latent ordering and compression on a per-element basis may achieve a higher PSNR at a given compression rate than latent ordering and compression on a per-channel basis, and latent ordering and compression on a per-pixel basis may achieve significantly lower PSNRs except at higher compression bitrates. For compression using sorting of channel-based coding units, compression performance may be similar for sorting by prior standard deviation, rate difference, or rate-distortion importance. However, for compression using sorting of element-based coding units or pixel-based coding units, it may be seen that compression performance diverges between different types of ordering. For example, for compressing using sorting of element-based coding units, it may be seen that ordering based on a rate difference metric may achieve better compression performance (e.g., higher PSNR for a given bit rate) than ordering based on a prior standard deviation.

Ordering coding units may impose some overhead for compression and decompression. For example, ordering coding units by prior standard deviation may allow for compression to be performed without needing additional information to reconstruct the compressed data, as the prior standard deviation may be known to the decoder once a hyperlatent is decoded. However, ordering coding units by a rate difference metric or rate-distortion importance metric may allow for more accurate ordering of coding units, at the expense of imposing a bitrate overhead for conveying the order in which coding units are encoded. In some aspects, where the order in which coding units are encoded is considered to be important enough to accept the additional overhead of conveying ordering information to a decoder as side information, various optimizations may be used to reduce the overhead involved in conveying this ordering information to the decoder. For example, larger coding units, such as blocks of pixels rather than individual pixels in a still image, may be used for compressing data, which may reduce the amount of side information to be conveyed. In another aspect, an expected order may be learned by a machine learning model from training data, and the expected order generated by the trained machine learning model may be conveyed to the decoder. In still further aspects, the ordering may be learned from other available information, such as from a latent already decoded using a larger quantization bin size.

Figure 14:
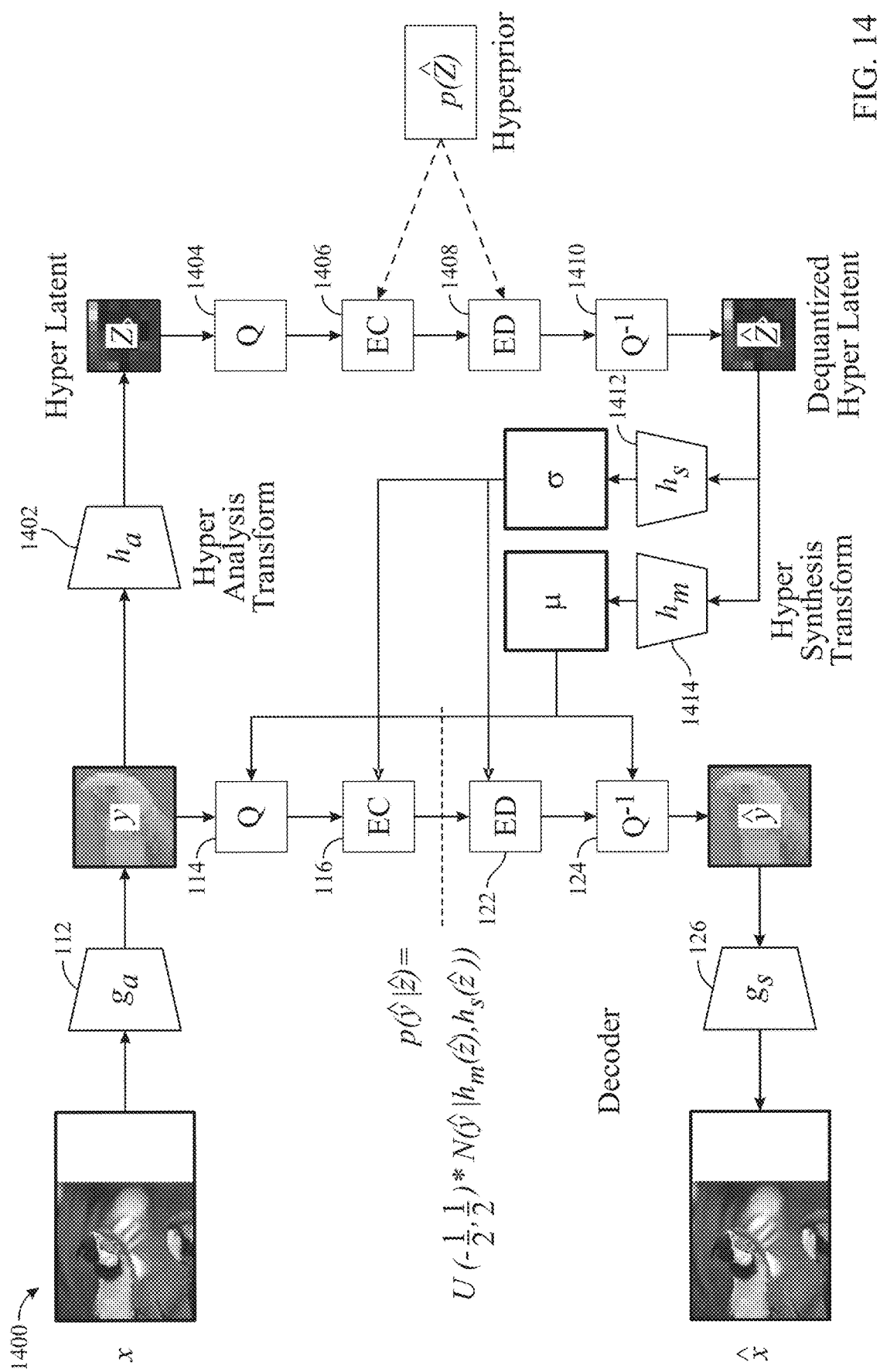
FIG. 14 illustrates an example neural network-based data compression pipeline in which side information is used to decompress data, according to aspects of the present disclosure.

FIG. 14 illustrates an example neural network-based data compression pipeline 1400 in which side information is used to decompress data.

As illustrated, a compression pipeline may include the elements illustrated in FIG. 1 and discussed above, as well as additional information used to generate and encode information for a side channel (e.g., a hyper latent z) that may be used in generating the approximation $\hat{x}$ of original content x from a compressed bitstream.

To generate the information for the side channel that may be used in decoding the compressed version of the latent space code y representing content x, a hyper analysis transform 1402 ($h_a$) may generate a hyper latent z, which may be quantized by quantizer 1404 and encoded into a hyperprior $p(\hat{z})$ by entropy coder 1406. The hyperprior may be transmitted with the compressed version of latent space code y and decoded using entropy decoder 1408 and dequantized using dequantizer 1410 to recover an approximation $\hat{z}$ of the hyper latent z. The approximation $\hat{z}$ may be processed through hypersynthesis transforms 1412 ($h_s$) and 1414 ($h_m$), respectively, to recover the prior standard deviation a and the prior mean μ.

The prior standard deviation a and mean μ may be used by the entropy coder 116 and the entropy decoder 122 to encode a quantized version of code y and recover the quantized version of code y from a bitstream representing the encoded, quantized version of code y. The prior mean μ, meanwhile, may be used as a parameter for quantizing y and dequantizing a bitstream recovered by entropy decoder 122 to recover an approximation ŷ of the latent space code y to which content x is mapped.

Example Processing System for Progressive Data Compression

Figure 15:
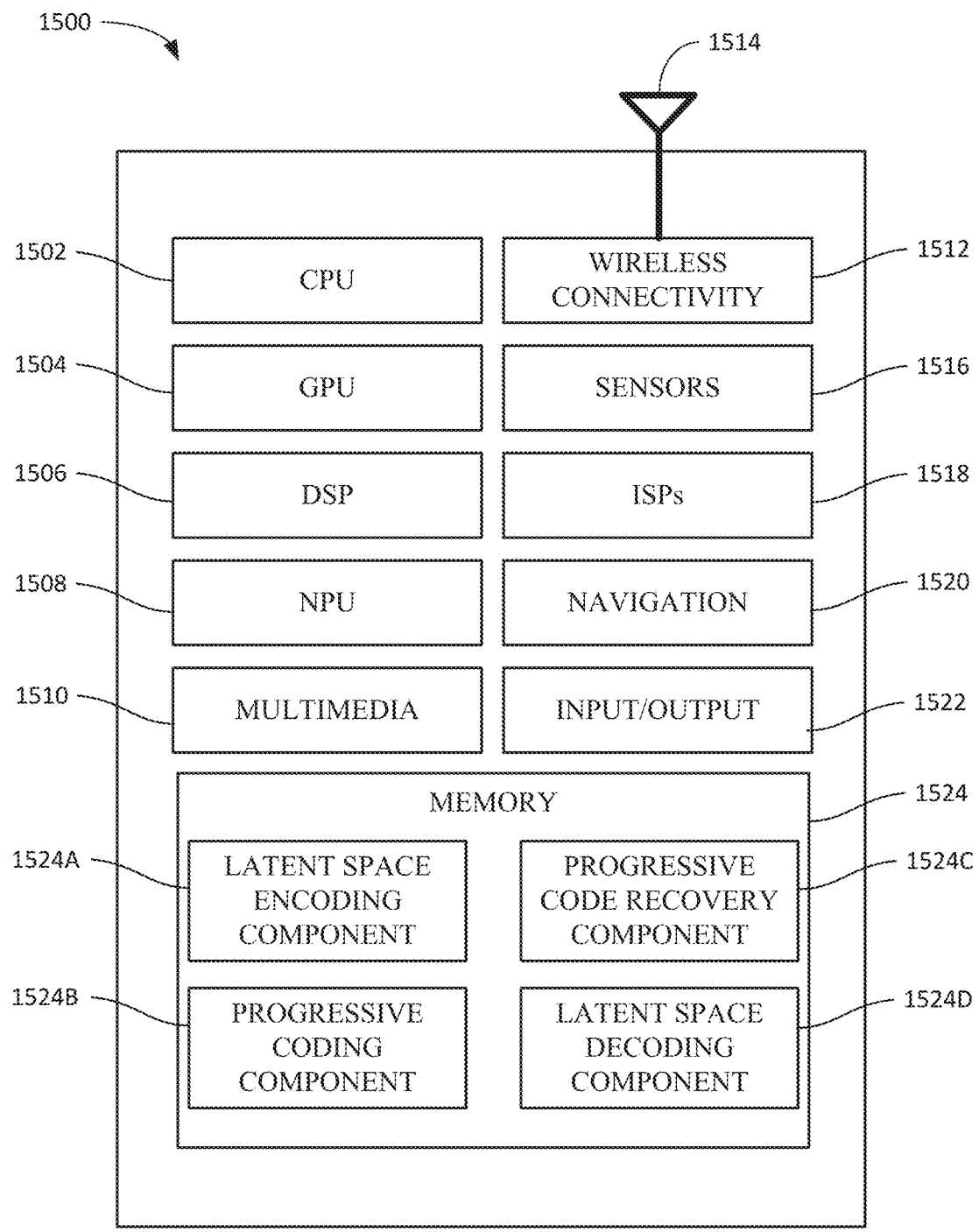
FIG. 15 illustrates an example implementation of a processing system on which progressive coding and decoding of content can be performed, according to aspects of the present disclosure.

FIG. 15 depicts an example processing system 1500 for performing convolutional neural network processing, such as described herein for example with respect to FIGS. 6-7.

Processing system 1200 includes a central processing unit (CPU) 1502, which in some examples may be a multi-core CPU. Instructions executed at the CPU 1502 may be loaded, for example, from a program memory associated with the CPU 1502 or may be loaded from a memory partition 1524.

Processing system 1500 also includes additional processing components tailored to specific functions, such as a graphics processing unit (GPU) 1504, a digital signal processor (DSP) 1506, a neural processing unit (NPU) 1508, a multimedia processing unit 1510, a multimedia processing unit 1510, and a wireless connectivity component 1512.

An NPU, such as 1508, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 1508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 1508 is a part of one or more of CPU 1502, GPU 1504, and/or DSP 1506.

In some examples, wireless connectivity component 1512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 1512 is further connected to one or more antennas 1514.

Processing system 1500 may also include one or more sensor processing units 1516 associated with any manner of sensor, one or more image signal processors (ISPs) 1518 associated with any manner of image sensor, and/or a navigation processor 1520, which may include satellite-based positioning system components (e.g., GPS or GLONASS) as well as inertial positioning system components.

Processing system 1500 may also include one or more input and/or output devices 1522, such as screens, touch-sensitive surfaces (including touch-sensitive displays), physical buttons, speakers, microphones, and the like.

In some examples, one or more of the processors of processing system 1500 may be based on an ARM or RISC-V instruction set.

Processing system 1500 also includes memory 1524, which is representative of one or more static and/or dynamic memories, such as a dynamic random access memory, a flash-based static memory, and the like. In this example, memory 1524 includes computer-executable components, which may be executed by one or more of the aforementioned processors of processing system 1500.

In particular, in this example, memory 1524 includes latent space encoding component 1524A, progressive coding component 1524B, progressive code recovery component 1524C, and latent space decoding component 1524D. The depicted components, and others not depicted, may be configured to perform various aspects of the methods described herein.

Generally, processing system 1500 and/or components thereof may be configured to perform the methods described herein.

Notably, in other aspects, aspects of processing system 1500 may be omitted, such as where processing system 1500 is a server computer or the like. For example, multimedia component 1510, wireless connectivity 1512, sensors 1516, ISPs 1518, and/or navigation component 1520 may be omitted in other aspects. Further, aspects of processing system 1500 may be distributed, such as training a model and using the model to generate inferences, such as user verification predictions.

Example Clauses

Clause 1: A method for compressing content using a neural network, comprising: receiving content for compression; encoding the content into a first latent code space through an encoder implemented by an artificial neural network; generating a first compressed version of the encoded content using a first quantization bin size of a series of quantization bin sizes; generating a refined compressed version of the encoded content by scaling the first compressed version of the encoded content into one or more second quantization bin sizes smaller than the first quantization bin size, conditioned at least on a value of the first compressed version of the encoded content; and outputting the refined compressed version of the encoded content.

Clause 2: The method of Clause 1, wherein generating the refined compressed version of the encoded content comprises: generating a first refined compressed version of the encoded content by scaling the first compressed version of the encoded content into a first finer quantization bin size, conditioned on a value of the first compressed version of the encoded content; and generating a second refined compressed version of the encoded content by scaling the first refined compressed version of the encoded content into a second finer quantization bin size, conditioned on a value of the first refined compressed version of the encoded content and the first compressed version of the encoded content, wherein the second finer quantization bin size is smaller than the first finer quantization bin size.

Clause 3: The method of Clauses 1 or 2, wherein a size of each respective quantization bin size of the series of quantization bin sizes is an integer multiple of the first quantization bin size.

Clause 4: The method of any of Clauses 1 through 3, wherein a center bin for a quantization bin size of the series of quantization bin sizes has a larger bin size than non-center bins in the quantization bin size.

Clause 5: The method of any of Clauses 1 through 4, wherein: generating the refined compressed version of the encoded content comprises generating a bitstream based on a chain of conditional probabilities, and each conditional probability in the chain of conditional probabilities is associated with a respective quantization bin size in the series of quantization bin sizes other than a finest quantization bin size and is conditioned on conditional probabilities calculated for quantization bin sizes larger than the respective quantization bin size.

Clause 6: The method of any of Clauses 1 through 5, wherein generating the refined compressed version of the encoded content comprises generating, for each quantization bin size of the series of quantization bin sizes, a probability mass of the encoded content based on a cumulative distribution function of an upper bound and a lower bound of each quantization bin in which the encoded content is located.

Clause 7: The method of Clause 6, wherein the probability mass for each respective quantization bin size of the series of quantization bin sizes is conditioned on probability masses for quantization bin sizes in the series of quantization bin sizes larger than the respective quantization bin size.

Clause 8: The method of any of Clauses 1 through 7, wherein the received content comprises content having multiple data channels.

Clause 9: The method of Clause 8, wherein each respective data channel of the multiple data channels is associated with a compression priority corresponding to an amount of compression to be used for compressing the respective data channel.

Clause 10: The method of Clause 9, wherein: the multiple data channels comprise a luminance channel and a plurality of chrominance channels in visual content, and the luminance channel is associated with a compression priority associated with a lower amount of compression than compression priorities associated with the plurality of chrominance channels.

Clause 11: The method of Clause 9, wherein: the received content comprises visual content to be compressed, the multiple data channels comprise a plurality of color data channels in the visual content, and a first color data channel of the plurality of color data channels having a highest impact on quality of the compressed version of the encoded content is associated with a compression priority associated with a lower amount of compression than compression priorities associated with color data channels other than the first color data channel.

Clause 12: The method of Clause 11, further comprising identifying the first color data channel based on an amount of luminance data included in each of the plurality of color data channels.

Clause 13: The method of any of Clauses 9 through 12, further comprising determining the compression priority associated with each respective data channel of the multiple data channels is based on calculating a decrease in distortion and calculating an increase in bitrate when the respective data channel is encoded for each of a plurality of bitrates associated with each quantization bin size in the series of quantization bin sizes.

Clause 14: The method of Clause 13, wherein calculating the decrease in distortion for each respective data channel comprises calculating a difference between distortion generated by decoding the encoded content a first time including the respective data channel and distortion generated by decoding the encoded content a second time excluding the respective data channel.

Clause 15: The method of any of Clauses 1 through 14, further comprising: dividing the received content into a plurality of coding units; and ordering the plurality of coding units based on a compression metric, wherein generating the refined compressed version of the encoded content comprises refining each of the plurality of coding units such that each of the plurality of coding units is compressed using a different level of quantization and coding units having higher compression metrics are compressed using a lower amount of compression than coding units having lower compression metrics.

Clause 16: The method of Clause 15, wherein dividing the received content into the plurality of coding units comprises dividing the received content into a plurality of elements, each element representing data for one of a plurality of channels at a specific location within the received content.

Clause 17: The method of Clause 15, wherein dividing the received content into the plurality of coding units comprises dividing the received content into a plurality of blocks, each block representing data for one of a plurality of channels at a specific range of locations within the received content.

Clause 18: The method of Clause 15, wherein dividing the received content into the plurality of coding units comprises dividing the received content into a plurality of channels.

Clause 19: The method of Clause 15, wherein dividing the received content into the plurality of coding units comprises dividing the received content into a plurality of pixels, each pixel representing data for a plurality of channels at a specified location within the received content.

Clause 20: The method of Clause 15, wherein the compression metric comprises a prior standard deviation encoded in a hyperlatent, wherein the hyperlatent comprises an initial portion of the refined compressed version of the encoded content.

Clause 21: The method of Clause 15, wherein the compression metric comprises a distortion-to-rate ratio, and the refined compressed version of the encoded content includes ordering information for the plurality of coding units from a highest distortion-to-rate ratio to a lowest distortion-to-rate ratio.

Clause 22: The method of Clause 15, wherein the compression metric comprises a change in rate metric, and the refined compressed version of the encoded content includes ordering information for the plurality of coding units from a change in rate to a lowest change in rate.

Clause 23: The method of any of Clauses 1 through 22, wherein the first quantization bin size is associated with a first bitrate, and each respective quantization bin size of the one or more second quantization bin sizes corresponds to a bitrate higher than the first bitrate.

Clause 24: A method for decompressing content using a neural network, comprising: receiving encoded content for decompression; recovering an approximation of a value in a latent code space from the received encoded content by recovering codes from a series of quantization bin sizes, wherein the series of quantization bin sizes comprises a first quantization bin size and one or more second quantization bin sizes smaller than the first quantization bin size; generating a decompressed version of the encoded content by decoding the approximation of the value in the latent code space through a decoder implemented by an artificial neural network; and outputting the decompressed version of the encoded content.

Clause 25: The method of Clause 24, wherein a size of each respective quantization bin size of the series of quantization bin sizes is an integer multiple of the first quantization bin size.

Clause 26: The method of Clauses 24 or 25, wherein a center bin for a quantization bin size of the series of quantization bin sizes has a larger bin size than non-center bins in the quantization bin size.

Clause 27: The method of any of Clauses 24 through 26, wherein: recovering the approximation of the value in the latent code space comprises recovering a code based on a chain of conditional probabilities from a bitstream representing the encoded content, and each conditional probability in the chain of conditional probabilities is associated with a respective quantization bin size in the series of quantization bin sizes other than a finest quantization bin size and is conditioned on conditional probabilities calculated for quantization bin sizes larger than the respective quantization bin size.

Clause 28: The method of any of Clauses 24 through 27, wherein recovering the approximation of the value in the latent code space comprises identifying, from each quantization bin size of the series of quantization bin sizes, a probability mass of the encoded content based on a cumulative distribution function of an upper bound and a lower bound of each quantization bin in which the encoded content is located.

Clause 29: The method of Clause 28, wherein the probability mass for each respective quantization bin size of the series of quantization bin sizes is conditioned on probability masses for quantization bin sizes in the series of quantization bin sizes larger than the respective quantization bin size.

Clause 30: The method of any of Clauses 24 through 29, wherein the received encoded content comprises content having multiple data channels.

Clause 31: The method of Clause 30, wherein each respective data channel of the multiple data channels is associated with a compression priority corresponding to an amount of compression to be used for compressing the respective data channel.

Clause 32: The method of Clause 31, wherein: the multiple data channels comprise a luminance channel and a plurality of chrominance channels in visual content, and the luminance channel is associated with a compression priority associated with a lower amount of compression than compression priorities associated with the plurality of chrominance channels.

Clause 33: The method of Clause 31, wherein: the received encoded content comprises visual content to be decompressed, the multiple data channels comprise a plurality of color data channels in the visual content, and a first color data channel of the plurality of color data channels having a highest impact on quality of the decompressed version of the encoded content is associated with a compression priority associated with a lower amount of compression than compression priorities associated with color data channels other than the first color data channel.

Clause 34: The method of Clause 33, further comprising identifying the first color data channel based on an amount of luminance data included in each of the plurality of color data channels.

Clause 35: The method of any of Clauses 24 through 34, wherein: the encoded content comprises a plurality of encoded coding units, and recovering the approximation of the value in a latent code space from the received encoded content comprises recovering a code in the latent code space associated with each of the plurality of encoded coding units.

Clause 36: The method of Clause 35, wherein the plurality of coding units comprises a plurality of elements, each element representing data for one of a plurality of channels at a specific location within the received content.

Clause 37: The method of Clause 35, wherein the plurality of coding units comprises a plurality of blocks, each block representing data for one of a plurality of channels at a specific range of locations within the received content.

Clause 38: The method of Clause 35, wherein the plurality of coding units comprises a plurality of channels.

Clause 39: The method of Clause 35, wherein the plurality of coding units comprises a plurality of pixels, each pixel representing data for a plurality of channels at a specified location within the received content.

Clause 40: The method of Clause 35, wherein recovering the approximation of the value in the latent code space comprises recovering a prior standard deviation encoded in a hyperlatent, wherein the hyperlatent comprises an initial portion of the encoded content.

Clause 41: The method of Clause 35, wherein recovering the approximation of the value in the latent space comprises recovering an order in which the plurality of coding units was compressed, the order being included as side information associated with the encoded content.

Clause 42: The method of any of Clauses 24 through 42, wherein the first quantization bin size is associated with a first bitrate, and each respective quantization bin size of the one or more second quantization bin sizes corresponds to a bitrate higher than the first bitrate.

Clause 43: A processing system, comprising: a memory comprising computer-executable instructions; one or more processors configured to execute the computer-executable instructions and cause the processing system to perform a method in accordance with any one of Clauses 1-42.

Clause 44: A processing system, comprising means for performing a method in accordance with any one of Clauses 1-42.

Clause 45: A non-transitory computer-readable medium comprising computer-executable instructions that, when executed by one or more processors of a processing system, cause the processing system to perform a method in accordance with any one of Clauses 1-42.

Clause 46: A computer program product embodied on a computer-readable storage medium comprising code for performing a method in accordance with any one of Clauses 1-42.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for compressing content using a neural network, comprising:
   receiving content for compression;
   encoding the content into a first latent code space through an encoder implemented by an artificial neural network;
   generating a first compressed version of the encoded content using a first quantization bin size of a series of quantization bin sizes;
   generating a refined compressed version of the encoded content by scaling the first compressed version of the encoded content into one or more second quantization bin sizes in the series of quantization bin sizes smaller than the first quantization bin size, conditioned at least on a value of the first compressed version of the encoded content; and
   outputting the refined compressed version of the encoded content;
   wherein generating the refined compressed version of the encoded content comprises:
      generating a first refined compressed version of the encoded content by scaling the first compressed version of the encoded content into a first finer quantization bin size, conditioned on a value of the first compressed version of the encoded content; and
      generating a second refined compressed version of the encoded content by scaling the first refined compressed version of the encoded content into a second finer quantization bin size conditioned on a value of the first refined compressed version of the encoded content and the first compressed version of the encoded content, wherein the second finer quantization bin size is smaller than the first finer quantization bin size.

2. The method of claim 1, wherein a size of each respective quantization bin size of the series of quantization bin sizes is an integer multiple of the first quantization bin size.

3. The method of claim 1, wherein a center bin for a quantization bin size of the series of quantization bin sizes has a larger bin size than non-center bins in the quantization bin size.

4. The method of claim 1, wherein:
   generating the refined compressed version of the encoded content comprises generating a bitstream based on a chain of conditional probabilities, and
   each conditional probability in the chain of conditional probabilities is associated with a respective quantization bin size in the series of quantization bin sizes other than a finest quantization bin size and is conditioned on conditional probabilities calculated for quantization bin sizes larger than the respective quantization bin size.

5. The method of claim 1, wherein:
   generating the refined compressed version of the encoded content comprises generating, for each quantization bin size of the series of quantization bin sizes, a probability mass of the encoded content based on a cumulative distribution function of an upper bound and a lower bound of each quantization bin in which the encoded content is located, and the probability mass for each respective quantization bin size of the series of quantization bin sizes is conditioned on probability masses for quantization bin sizes in the series of quantization bin sizes larger than the respective quantization bin size.

6. The method of claim 1, wherein:
the encoded content comprises content having multiple data channels, and
each respective data channel of the multiple data channels is associated with a compression priority corresponding to an amount of compression to be used for compressing the respective data channel.

7. The method of claim 6, further comprising determining the compression priority associated with each respective data channel of the multiple data channels is based on calculating a decrease in distortion after decoding and calculating an increase in bitrate when the respective data channel is encoded for each of a plurality of bitrates associated with each quantization bin size in the series of quantization bin sizes.

8. The method of claim 7, wherein calculating the decrease in distortion for each respective data channel comprises calculating a difference between distortion generated by decoding the encoded content a first time including the respective data channel and distortion generated by decoding the encoded content a second time excluding the respective data channel.

9. The method of claim 1, further comprising:
dividing the received content into a plurality of coding units; and
ordering the plurality of coding units based on a compression metric,
wherein generating the refined compressed version of the encoded content comprises refining each of the plurality of coding units such that each of the plurality of coding units is compressed using a different level of quantization and coding units having higher compression metrics are compressed using a lower amount of compression than coding units having lower compression metrics.

10. The method of claim 9, wherein dividing the received content into the plurality of coding units comprises dividing the received content into a plurality of elements, each element representing data for one of a plurality of channels at a specific location within the received content.

11. The method of claim 9, wherein dividing the received content into the plurality of coding units comprises dividing the received content into a plurality of blocks, each block representing data for one of a plurality of channels at a specific range of locations within the received content.

12. The method of claim 9, wherein dividing the received content into the plurality of coding units comprises dividing the received content into a plurality of channels.

13. The method of claim 9, wherein dividing the received content into the plurality of coding units comprises dividing the received content into a plurality of pixels, each pixel representing data for a plurality of channels at a specified location within the received content.

14. The method of claim 9, wherein the compression metric comprises one or more of:
a prior standard deviation encoded in a hyperlatent, wherein the hyperlatent comprises an initial portion of the refined compressed version of the encoded content;

a distortion-to-rate ratio, wherein the refined compressed version of the encoded content includes ordering information for the plurality of coding units from a highest distortion-to-rate ratio to a lowest distortion-to-rate ratio; or a change in rate metric, wherein the refined compressed version of the encoded content includes ordering information for the plurality of coding units from a change in rate to a lowest change in rate.

15. The method of claim 1, wherein:
the first quantization bin size is associated with a first bitrate, and
each respective quantization bin size of the one or more second quantization bin sizes corresponds to a bitrate higher than the first bitrate.

16. A method for decompressing content using a neural network, comprising:
receiving encoded content for decompression;
recovering an approximation of a value in a latent code space from the received encoded content by recovering codes from a series of quantization bin sizes, wherein the series of quantization bin sizes comprises a first quantization bin size and one or more second quantization bin sizes smaller than the first quantization bin size;
generating a decompressed version of the encoded content by decoding the approximation of the value in the latent code space through a decoder implemented by an artificial neural network; and
outputting the decompressed version of the encoded content;
wherein:
the encoded content comprises a plurality of encoded coding units, and
recovering the approximation of the value in a latent code space from the received encoded content comprises recovering a code in the latent code space associated with each of the plurality of encoded coding units.

17. The method of claim 16, wherein:
a size of each respective quantization bin size of the series of quantization bin sizes is an integer multiple of the first quantization bin size,
recovering the approximation of the value in the latent code space comprises recovering a code based on a chain of conditional probabilities from a bitstream representing the encoded content, and
each conditional probability in the chain of conditional probabilities is associated with a respective quantization bin size in the series of quantization bin sizes other than a finest quantization bin size and is conditioned on conditional probabilities calculated for quantization bin sizes larger than the respective quantization bin size.

18. The method of claim 16, wherein:
recovering the approximation of the value in the latent code space comprises identifying, from each quantization bin size of the series of quantization bin sizes, a probability mass of the encoded content based on a cumulative distribution function of an upper bound and a lower bound of each quantization bin in which the encoded content is located, and
the probability mass for each respective quantization bin size of the series of quantization bin sizes is conditioned on probability masses for quantization bin sizes in the series of quantization bin sizes larger than the respective quantization bin size.

19. The method of claim 16, wherein:
the received encoded content comprises content having multiple data channels, and
each respective data channel of the multiple data channels is associated with a compression priority corresponding to an amount of compression to be used for compressing the respective data channel.

20. The method of claim 7, wherein the plurality of coding units comprises a plurality of elements, each element representing data for one of a plurality of channels at a specific location within the received content.

21. The method of claim 16, wherein the plurality of coding units comprises a plurality of blocks, each block representing data for one of a plurality of channels at a specific range of locations within the received content.

22. The method of claim 16, wherein the plurality of coding units comprises a plurality of channels.

23. The method of claim 16, wherein the plurality of coding units comprises a plurality of pixels, each pixel representing data for a plurality of channels at a specified location within the received content.

24. The method of claim 16, wherein recovering the approximation of the value in the latent code space comprises recovering a prior standard deviation encoded in a hyperlatent, wherein the hyperlatent comprises an initial portion of the encoded content.

25. The method of claim 16, wherein recovering the approximation of the value in the latent code space comprises recovering an order in which the plurality of coding units was compressed, the order being included as side information associated with the encoded content.

26. The method of claim 16, wherein:
the first quantization bin size is associated with a first bitrate, and
each respective quantization bin size of the one or more second quantization bin sizes corresponds to a bitrate higher than the first bitrate.

27. A system, comprising:
at least one memory having executable instructions stored thereon; and
at least one processor configured to execute the executable instructions to cause the system to:
receive content for compression;
encode the content into a first latent code space through an encoder implemented by an artificial neural network;
generate a first compressed version of the encoded content using a first quantization bin size of a series of quantization bin sizes;
generate a refined compressed version of the encoded content by scaling the first compressed version of the encoded content into one or more second quantization bin sizes in the series of quantization bin sizes smaller than the first quantization bin size, conditioned at least on a value of the first compressed version of the encoded content; and
output the refined compressed version of the encoded content;
wherein the at least one processor is further configured to execute the executable instructions to cause the system to generate the refined compressed version of the encoded content by:
generating a first refined compressed version of the encoded content by scaling the first compressed version of the encoded content into a first finer quantization bin size, conditioned on a value of the first compressed version of the encoded content; and
generating a second refined compressed version of the encoded content by scaling the first refined compressed version of the encoded content into a second finer quantization bin size conditioned on a value of the first refined compressed version of the encoded content and the first compressed version of the encoded content, wherein the second finer quantization bin size is smaller than the first finer quantization bin size.

28. A system, comprising:
at least one memory having executable instructions stored thereon; and
at least one processor configured to execute the executable instructions to cause the system to:
receive encoded content for decompression;
recovering an approximation of a value in a latent code space from the received encoded content by recovering codes from a series of quantization bin sizes, wherein the series of quantization bin sizes comprises a first quantization bin size and one or more second quantization bin sizes smaller than the first quantization bin size;
generate a decompressed version of the encoded content by decoding the approximation of the value in the latent code space through a decoder implemented by an artificial neural network; and
output the decompressed version of the encoded content;
wherein the encoded content comprises a plurality of encoded coding units; and
wherein the at least one processor is further configured to execute the executable instructions to cause the system to recover the approximation of the value in a latent code space from the received encoded content by recovering a code in the latent code space associated with each of the plurality of encoded coding units.

\* \* \* \* \*